US012610259B2

(12) United States Patent
Whdan et al.

(10) Patent No.: US 12,610,259 B2
(45) Date of Patent: Apr. 21, 2026

(54) SYSTEM AND METHOD FOR RESOLVING CALL FAILURES IN A CELLULAR NETWORK

(71) Applicant: DISH Wireless L.L.C., Englewood, CO (US)

(72) Inventors: Ahmed Awwad Whdan, Centennial, CO (US); Satish Kumar Sharma, Englewood, CO (US); Arnold Foronda Agcaoili, Littleton, CO (US)

(73) Assignee: DISH Wireless L.L.C., Englewood, CO (US)

( * ) Notice: Subject to any disclaimer, the term of this patent is extended or adjusted under 35 U.S.C. 154(b) by 315 days.

(21) Appl. No.: 18/398,892

(22) Filed: Dec. 28, 2023

(65) Prior Publication Data

US 2025/0220455 A1     Jul. 3, 2025

(51) Int. Cl.
*H04W 24/02*     (2009.01)
*H04W 16/18*     (2009.01)
(52) U.S. Cl.
CPC ........... *H04W 24/02* (2013.01); *H04W 16/18* (2013.01)
(58) Field of Classification Search
CPC ..... H04W 24/10; H04W 24/02; H04W 48/16; H04W 76/27; H04W 16/28; H04W 24/08;

H04W 76/10; H04W 36/0085; H04W 4/029; H04W 36/302; H04W 36/00837; H04W 8/005; H04W 88/02; H04W 76/15; H04W 36/0088

USPC ........................................................ 455/446
See application file for complete search history.

(56) References Cited

U.S. PATENT DOCUMENTS

| | | | | |
|---|---|---|---|---|
| 2008/0299910 | A1* | 12/2008 | Petersen ............... | H04W 24/00 455/67.11 |
| 2019/0364470 | A1* | 11/2019 | Chen ................... | H04L 65/1069 |
| 2022/0334892 | A1* | 10/2022 | Godwin ................. | G06F 9/547 |

* cited by examiner

*Primary Examiner* — Ajibola A Akinyemi
(74) *Attorney, Agent, or Firm* — Baker Botts L.L.P.

(57) ABSTRACT

Data relating to call failures that occurred in a wireless communication network is accessed from a memory, the data including a plurality of call failure samples. The call failure samples are classified into a plurality of sets, wherein each set is associated with a first range of values of the coverage parameter and a second range of values of the signal quality parameter. One or more remedial actions associated with a particular set of the call failure samples is obtained, wherein each set of the call failure samples is associated with respective at least one remedial actions. An indication is generated that the one or more remedial actions is to be performed to resolve call failure events associated with call failure samples in the particular set of the call failure samples.

20 Claims, 7 Drawing Sheets

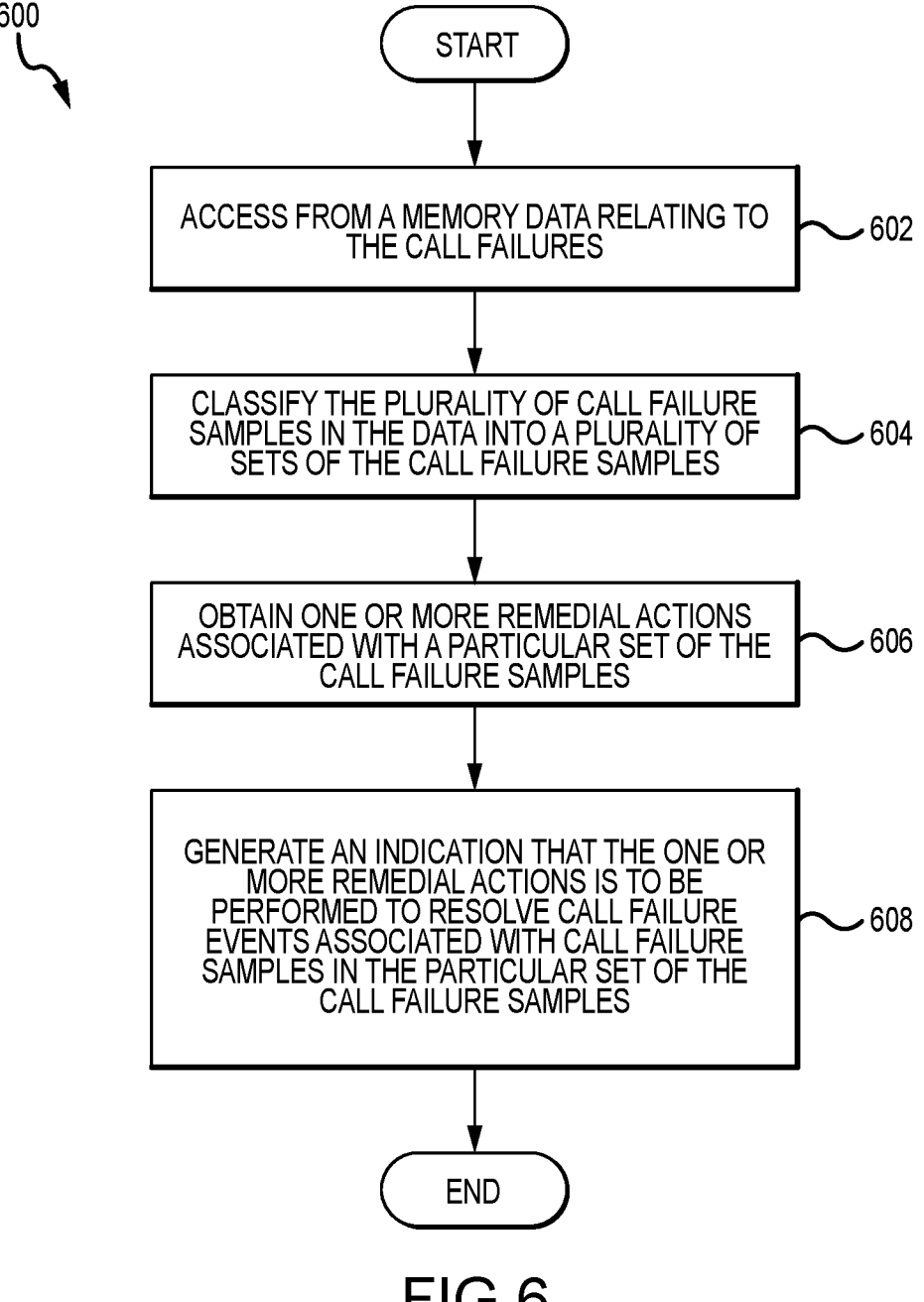

600

START

ACCESS FROM A MEMORY DATA RELATING TO THE CALL FAILURES — 602

CLASSIFY THE PLURALITY OF CALL FAILURE SAMPLES IN THE DATA INTO A PLURALITY OF SETS OF THE CALL FAILURE SAMPLES — 604

OBTAIN ONE OR MORE REMEDIAL ACTIONS ASSOCIATED WITH A PARTICULAR SET OF THE CALL FAILURE SAMPLES — 606

GENERATE AN INDICATION THAT THE ONE OR MORE REMEDIAL ACTIONS IS TO BE PERFORMED TO RESOLVE CALL FAILURE EVENTS ASSOCIATED WITH CALL FAILURE SAMPLES IN THE PARTICULAR SET OF THE CALL FAILURE SAMPLES — 608

END

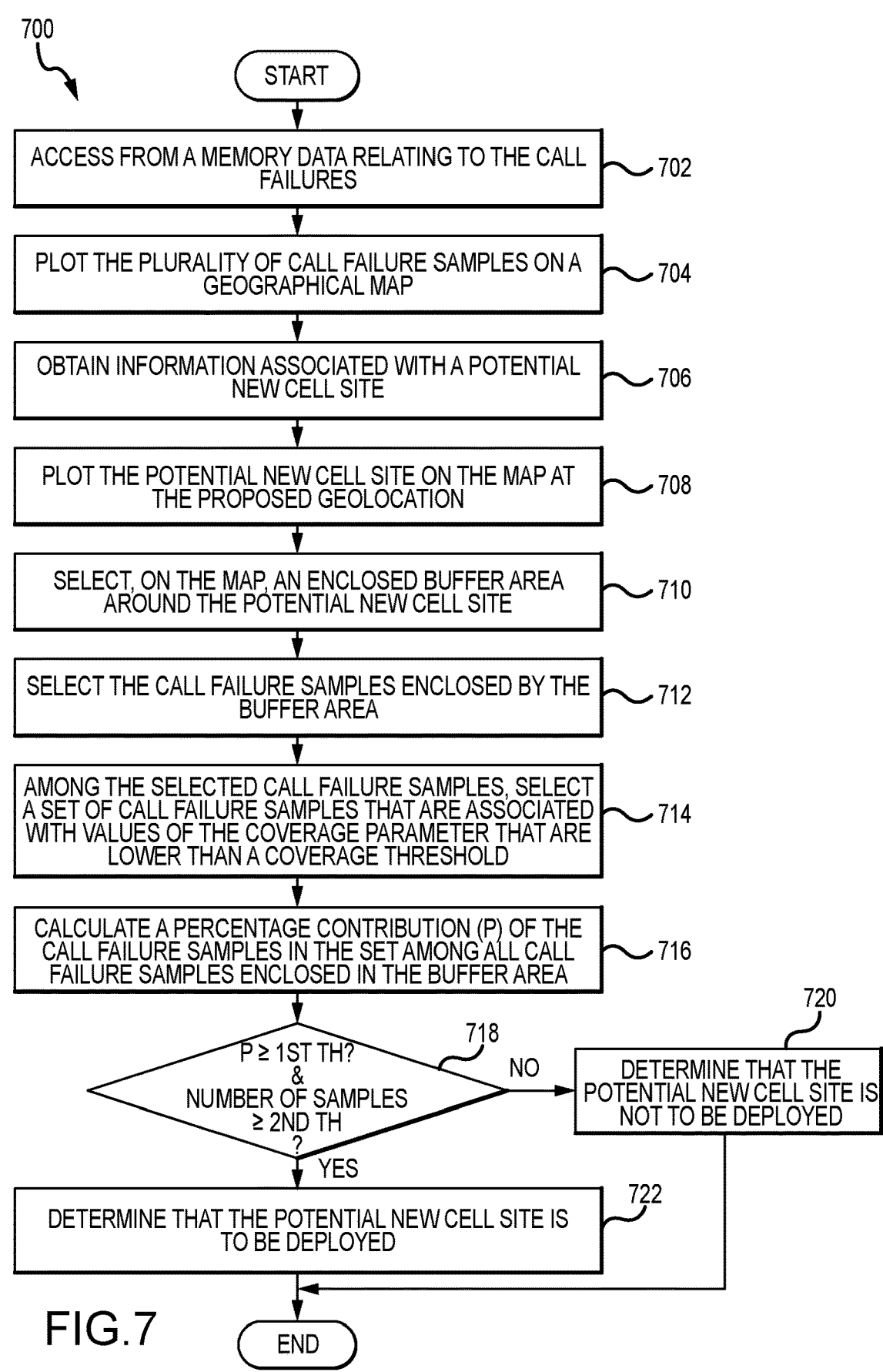

START

ACCESS FROM A MEMORY DATA RELATING TO THE CALL FAILURES — 702

PLOT THE PLURALITY OF CALL FAILURE SAMPLES ON A GEOGRAPHICAL MAP — 704

OBTAIN INFORMATION ASSOCIATED WITH A POTENTIAL NEW CELL SITE — 706

PLOT THE POTENTIAL NEW CELL SITE ON THE MAP AT THE PROPOSED GEOLOCATION — 708

SELECT, ON THE MAP, AN ENCLOSED BUFFER AREA AROUND THE POTENTIAL NEW CELL SITE — 710

SELECT THE CALL FAILURE SAMPLES ENCLOSED BY THE BUFFER AREA — 712

AMONG THE SELECTED CALL FAILURE SAMPLES, SELECT A SET OF CALL FAILURE SAMPLES THAT ARE ASSOCIATED WITH VALUES OF THE COVERAGE PARAMETER THAT ARE LOWER THAN A COVERAGE THRESHOLD — 714

CALCULATE A PERCENTAGE CONTRIBUTION (P) OF THE CALL FAILURE SAMPLES IN THE SET AMONG ALL CALL FAILURE SAMPLES ENCLOSED IN THE BUFFER AREA — 716

P ≥ 1ST TH?
&
NUMBER OF SAMPLES ≥ 2ND TH ?    718

NO

720

DETERMINE THAT THE POTENTIAL NEW CELL SITE IS NOT TO BE DEPLOYED

YES

DETERMINE THAT THE POTENTIAL NEW CELL SITE IS TO BE DEPLOYED    722

FIG.7

END

SYSTEM AND METHOD FOR RESOLVING CALL FAILURES IN A CELLULAR NETWORK

TECHNICAL FIELD

The present disclosure relates generally to wireless communications, and more specifically to a system and method for resolving call failures in a cellular network.

BACKGROUND

Performance of a cellular network is often monitored and measured by cellular network operators to understand how well the network is performing in particular areas of cell coverage and to determine any problems with the cellular network. Decisions are made with regard to deployment of new cell sites, placement of cell sites and upgradation of existing cell sites based on network performance data collected for a particular cellular network.

SUMMARY

The system and methods implemented by the system as disclosed in the present disclosure provide an intelligent technique to identify root causes of call failures in a wireless network and resolve the identified root causes. The disclosed system and methods provide several practical applications and technical advantages. For example, the disclosed system and method provide the practical application of determining performance issues associated with a cellular network quickly and accurately. The disclosed system and method provide the additional practical application of effectively resolving the identified problems in the cellular network to improve network performance and/or maintain high levels of performance within the cellular network.

As described in embodiments of the present disclosure a performance server obtains a plurality of call samples (including call failure samples) recorded by one or more user equipment (UEs) in a wireless network (e.g., cellular network). Each call failure sample is associated with a call failure event such as a call drop event or a call setup failure event and includes values of a plurality of parameters recorded by the UE. The performance server classifies the call failure samples into a plurality of sample sets, wherein each sample set of call failure samples is associated with particular network conditions in which the respective call failure samples assigned to the sample set were recorded. Each sample set is associated with one or more root causes and one or more remedial actions that can be implemented to resolve one or more of the root causes. Once the call failure samples have been classified/grouped into the sample sets, the performance server identifies one or more root causes that caused call failure events associated with the call failure samples and provide recommendations of remedial actions that need to be implemented to resolve the identified root causes. For example, when one or more call failure samples are assigned to a particular sample set, the performance server obtains the possible root causes mapped to the particular sample set and the corresponding remedial actions for each of the root causes. The performance server generates a report that includes the possible root causes mapped to the particular sample set and a recommendation of a corresponding remedial action for each of the root causes. The report generated by the performance server may be used as a guidance by a network operator associated with the cellular network to identify and resolve one or more root causes that caused the call failure events to occur.

By identifying root causes associated with call failure events quickly and accurately and further determining and recommending correct remedial measures for the identified root causes, the proposed system and method allow quick resolution of network issues which improves overall performance of the wireless network. Further, by determining a root cause associated with a call failure event intelligently and accurately, the disclosed system and method save computing resources and network bandwidth that would otherwise be used to investigate the call failure and applying various remedial measures one by one until the problem is resolved. Thus, the disclosed system and method improve processing performance of computing systems used to implement network components and also improve network performance.

The disclosed system and method provide an additional practical application of determining which proposed new cell sites are expected to have a high impact on resolving reported call failure issues and provide a recommendation to deploy those high impact new cell sites. As described in embodiments of the present disclosure, the performance server determines an impact that deploying a potential/proposed new cell site may have in improving call failure issues occurring at a geographical location where the potential new cell site is proposed for deployment, and further determine whether the potential new cell site is to be deployed at the geographical location based on a determined degree of impact associated with deploying the potential new cell site. To determine an impact of deploying a potential new cell site at a proposed geolocation, the performance server analyzes call failure samples recorded in the vicinity of the proposed geolocation under poor network coverage conditions. The performance server selects those call failure samples that are enclosed in a pre-selected buffer area around a potential new cell site and were recorded under poor coverage conditions. The performance server then calculates a percentage contribution (P) of the selected call failure samples among all call failure samples enclosed in the buffer area. When the calculated percentage contribution (P) equals or exceeds a first percentage threshold and the number of selected call failure samples equals or exceeds a second number threshold, the performance server determines that the potential new cell site is expected to have high impact in improving call failure issues and determines that the potential new cell site is to be deployed at the proposed location.

By identifying new cell sites that are expected to have high impact in resolving call failure issues and recommending deployment of high impact new cell sites, the disclosed system and method improve network performance occurring as a result of deploying the high impact new cell sites.

Thus, the disclosed system and methods generally improve the technology related to cellular networks and communication using such networks.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 6 is a flowchart of an example method for resolving call failures in a cellular network, in accordance with embodiments of the present disclosure; and FIG. 7 is a flowchart of an example method for making deployment decisions relating to new cell sites, in accordance with embodiments of the present disclosure.

DETAILED DESCRIPTION

System Overview

Figure 1:
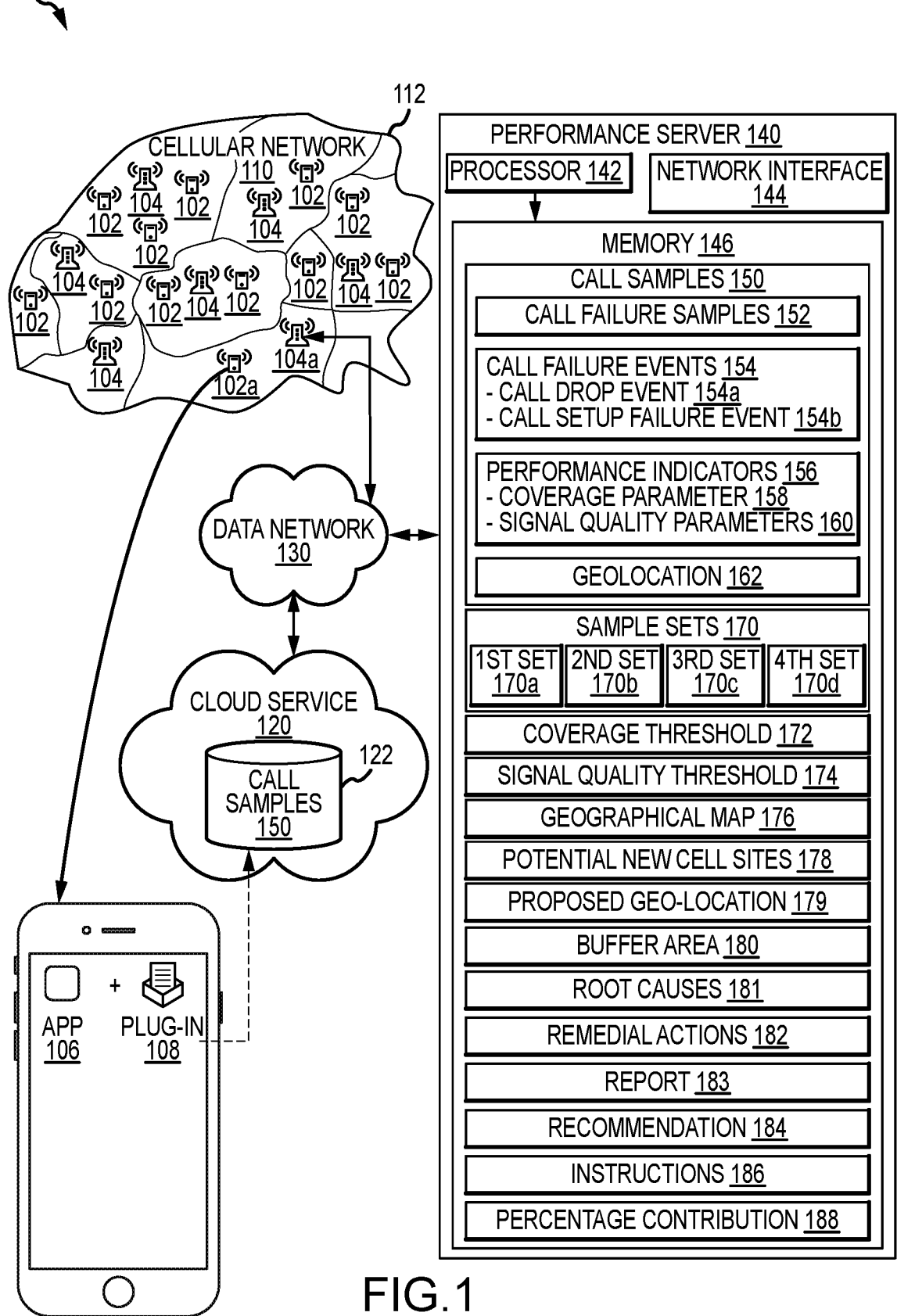
FIG. 1 illustrates a system in accordance with embodiments of the present disclosure.

FIG. 1 illustrates an example system 100, in accordance with embodiments of the present disclosure. As shown in FIG. 1, system 100 may include a cellular network 110, a cloud service 120, and a performance server 140, each connected to a data network 130. The cellular network 110 may include a plurality of cell sites 104 deployed across a geographical region 112. In one embodiment, each cell site 104 may include a base station consisting of a base station tower having one or more radio antennas mounted thereon. A base station tower, often also referred to as a cell tower, is a fixed radio transceiver that is capable of sending and receiving wireless signals and is the main communication point for user equipment (UEs) 102. It may be noted that the terms "base station tower", "cell tower" may be used interchangeably throughout this disclosure. A cell site 104 generally provides radio cellular coverage in a specific coverage area in the vicinity of the cell site 104, the coverage area generally referred to as a cell. UEs 102 that are located within the coverage area or cell of a particular cell site 104 may wirelessly connect to the base station tower of the cell site 104 and access services provided by the cell site 104.

In the context of 5$^{th}$ Generation (5G) New Radio (NR), a base station of a cell site 104 may be referred to as a gNodeB or gNB. It may be noted that the terms "base station" and "gNodeB" may be used interchangeably throughout this disclosure. A base station may provide a UE 102 connected to the base station access to a 5G core (not shown) which in turn provides the UE 102 access to the data network 130. For example, the base station may be part of a 5G NR cellular network. A cell site 104 may serve a particular geographical area or cell, with other base stations serving neighboring geographical areas or neighboring cells that at least partially overlap. Services provided by the cellular network 110 may include telephone calls, network access (e.g., access to data network 130), data reporting, text messaging services, etc. Such services may generally rely on packetized data being exchanged between the UE 102 and a base station at a cell site 104.

While cellular network 110 is described in the context of a 5G NR radio network that uses gNodeBs as base stations, the embodiments detailed herein can be applicable to other types of cellular networks, such as a 4G Long Term Evolution (LTE) cellular network, that uses eNodeBs in place of gNodeBs. In one or more embodiments, cellular network 110 operates according to the 5G NR radio access technology (RAT). In other embodiments, a different RAT may be used, such as 3G, 4G Long Term Evolution (LTE), or some other RAT. In some other embodiments, as shown in FIG. 1, the cellular network 110 may use a 5G core. In some embodiments, the cellular network 110 may use an evolved packet core (EPC) instead of or in addition to the 5G core.

UE 102 may be one of various forms of wireless devices that are capable of communication according to the radio access technology (RAT) of the cellular network 110. For instance, UE 102 can be a smartphone, wireless modem, cellular phone, laptop computer, wireless access point (APs), etc.

The data network 130, in general, may be a wide area network (WAN), a personal area network (PAN), a cellular network, or any other technology that allows devices to communicate electronically with other devices. In one or more embodiments, the data network 130 may be the Internet.

In one or more embodiments, the performance server 140 may be implemented by a computing device running one or more software applications. For example, the performance server 140 may be representative of a computing system hosting software applications that may be installed and run locally or may be used to access software applications running on the performance server 140. The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, the performance server 140 may be representative of a server running one or more software applications to implement respective functionality as described below. In certain embodiments, the performance server 140 may run a thin client software application where the processing is directed by the thin client but largely performed by a central entity such as a central server (not shown).

Performance of a cellular network (e.g., cellular network 110) is often monitored and measured by cellular network operators to understand how well the network is performing in particular areas of cell coverage and to determine any problems with the cellular network. Additionally, decisions are made with regard to deployment of new cell sites, placement of cell sites and upgradation of existing cell sites based on network performance data collected for a particular cellular network. It is important that any issues within a cellular network affecting user experience are quickly detected and resolved to avoid customer dissatisfaction and maintain customer retention.

Embodiments of the present disclosure describe improved techniques for determining performance issues associated with a cellular network quickly and accurately. Further, the disclosed techniques describe effective resolution of the identified problems in the cellular network to improve network performance and/or maintain high levels of performance within the cellular network.

UEs 102 that are connected to the cellular network 110 may be used to collect data associated with a plurality of parameters associated with calls placed by the UEs 102 and/or received by the UEs 102. For example, a UE 102a (e.g., a smartphone) that is connected to the cellular network 110 may be used to collect data associated with a plurality of performance indicators 156, wherein each performance indicator 156 indicates performance of the cellular network 110. In one embodiment, a software plug-in 108 is embedded into a mobile application 106 installed at the UE 102a (e.g., a smartphone). The software plug-in 108 is configured to collect data relating to a plurality of parameters including one or more performance indicators 156 when the mobile application 106 is active at the UE 102. In one embodiment, the mobile application 106 may include a mobile application that allows a user to place and receive wireless voice and/or data calls in the cellular network 110. In alternative or additional embodiments, the mobile application 106 may include other mobile applications that include transmission and/or reception of data using the cellular network 110. For example, the software plug-in 108 initiates collection of data related to one or more parameters including performance indicators 156 when the mobile application 106 is used at the UE 102a is used to place a voice/data call to another UE 102 within the cellular network 110 and/or receive a voice/data call from another UE 102 within the cellular network 110. Each voice/data call placed by the UE 102a or received by the UE 102a is a call event, and data recorded relating to each call event may be referred to as a call sample 150.

In one embodiment, for each voice/data call placed or received by the UE 102a, the software plug-in 108 operating at the UE 102a may be configured to collect data relating to a plurality of performance indicators 156 that indicate performance of the cellular network 110. The performance indicators 156 may include a coverage parameter 158 that indicates a power associated with a network signal measured by the UE 102a. For example, the UE 102a may be configured to measure the power of the radio signal received from a cell tower of a cell site 104a that the UE 102a is connected to. In one example, the coverage parameter includes Reference Signal Received Power (RSRP). The performance indicators 156 recorded by the UE 102a may additionally include a signal quality parameter 160 that indicates a quality of a network signal measured by the UE 102a. The signal quality parameter 160 indicates a degree of interference experienced by the UE 102a from other nearby UEs 102 and/or cell sites 104 operating in the cellular network 110. In one example, the signal quality parameter 160 includes Signal to Interference Noise Ratio (SINR). Other parameters collected by the UE 102a relating to a call event as part of a respective call sample 150 may include, but are not limited to, date and time of the call event, a unique call identity (ID) for the call event, a device ID associated with the UE 102a, make and model of the UE 102a, a geolocation 162 of the UE 102a at the time of the call event, a cell ID associated with the cell site 104a the UE 102a is connected to, a cell site ID of the cell site 104a.

In addition, for each call event, a UE 102 may record whether the call placed or received by the UE 102a was successful or failed. Each call event that results in a failed call may be referred to as a call failure event 154. A call failure event 154 may include a call drop event 154a or a call setup failure event 154b. A call drop event 154a refers to a call event in which a an active/ongoing call between two parties (e.g., UEs 102) cuts off involuntarily. A call setup failure event 154b refers to a call event in which a connection fails to establish between a calling party (e.g., a UE 102) and a called party (e.g., another UE 102). In one embodiment, for each call failure event 154, the UE 102 may further record, as part of the respective call sample 152 associated with the call failure event 154, whether the call failure event 154 was a call drop event 154a or a call setup failure event 154b. A call sample 150 associated with a call failure event 154 may be referred to as a call failure sample 152. Thus, the overall call samples 150 collected by the UE 102a may include one or more call failure samples 152, wherein each call failure sample 152 includes data relating to parameters associated with a particular call failure event 154 (e.g., a call drop event 154a or a call setup failure event 154b).

Thus, each call sample 150 (including call failure samples 152) recorded at the UE 102a includes data relating to one or more RSRP measurements, one or more SINR measurements, date and time of the call event, a unique call identity (ID) for the call event, a device ID associated with the UE 102a, make and model of the UE 102a, a geolocation 162 of the UE 102a at the time of the call event, a cell ID associated with the cell site 104a the UE 102a is connected to, a cell site ID of the cell site 104a, whether the call placed or received by the UE 102a was successful or failed, or whether the call failure event 154 was a call drop event 154a or a call setup failure event 154b.

Each UE 102 that records call samples 150 may be configured to store the recorded call samples 150 in a database 122 (e.g., SQL Database) that is connected to the data network 130. For example, UE 102a may be configured to store call samples 150 in the database 122. In one embodiment, the database 122 may be hosted in a cloud service 120 and may be part of cloud storage provided by the cloud service 120.

The performance server 140 includes a processor 142, a memory 146, and a network interface 144. The performance server 140 may be configured as shown in FIG. 1 or in any other suitable configuration.

The processor 142 includes one or more processors operably coupled to the memory 146. The processor 142 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 142 may be a programmable logic device, a microcontroller, a microprocessor, or any suitable combination of the preceding. The processor 142 is communicatively coupled to and in signal communication with the memory 146. The one or more processors are configured to process data and may be implemented in hardware or software. For example, the processor 142 may be 8-bit, 16-bit, 32-bit, 64-bit or of any other suitable architecture. The processor 142 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions 186 to implement the performance server 140. In this way, processor 142 may be a special-purpose computer designed to implement the functions disclosed herein. In one or more embodiments, the performance server 140 is implemented using logic units, FPGAs, ASICs, DSPs, or any other suitable hardware. The performance server 140 is configured to operate as described with reference to FIGS. 6 and 7. For example, the processor 142 may be configured to perform at least a portion of the method 600 as described in FIG. 6 and method 700 as described in FIG. 7.

The memory 146 comprises a non-transitory computer-readable medium such as one or more disks, tape drives, or solid-state drives, and may be used as an over-flow data storage device, to store programs when such programs are selected for execution, and to store instructions and data that are read during program execution. The memory 146 may be volatile or non-volatile and may comprise a read-only memory (ROM), random-access memory (RAM), ternary content-addressable memory (TCAM), dynamic random-access memory (DRAM), and static random-access memory (SRAM).

The memory 146 is operable to store call failure samples 150, sample sets 170, coverage threshold 172, signal quality threshold 174, geographical maps 176, potential new cell sites 178, buffer area 180, root causes 181, remedial actions 182, reports 183, recommendations 184, and instructions 186. The instructions 186 may include any suitable set of instructions, logic, rules, or code operable to execute the performance server 140.

The network interface 144 is configured to enable wired and/or wireless communications. The network interface 144 is configured to communicate data between the performance server 140 and other devices, systems, or domains (e.g., cloud service 120 and cellular network 110). For example, the network interface 144 may comprise a Wi-Fi interface, a LAN interface, a WAN interface, a modem, a switch, or a router. The processor 142 is configured to send and receive data using the network interface 144. The network interface 144 may be configured to use any suitable type of communication protocol as would be appreciated by one of ordinary skill in the art.

It may be noted that each UE 102, may be implemented similar to the performance server 140. For example, a UE 102 may include a processor and a memory storing instructions to implement the respective functionality of the UE 102 when executed by the processor.

In one or more embodiments, the performance server 140 may have access to the performance data relating to the call samples 150 collected using one or more UEs 102 such as UE 102a. In one embodiment, performance server 140 may (e.g., periodically or when needed) extract at least a portion of the data related to the call samples 150 stored in the database 122 from the cloud service 120 and store locally in memory 146. For example, performance server 140 may extract call samples 150 collected by a particular UE 102a and store locally in memory 146.

In one or more embodiments, to facilitate efficient and accurate identification of root causes associated with call failure events 154 recorded in the cellular network 110 and to allow for quick and effective resolution of the identified root causes, the performance server 140 may be configured to classify the call samples 150 (including the call failure samples 152) into several sample sets 170 based on the respective performance indicators 156 recorded for the call samples 150. For example, based on the performance indicators 156 recorded for each call sample 150, the performance server 140 generates four sample sets 170 and divides the call samples into the four sample sets 170 including first sample set 170a, a second sample set 170b, a third sample set 170c and a fourth sample set 170d. In an additional or alternative embodiment, as described below with reference to FIG. 3B, the performance server 140 separately classifies all call failure samples 152 into the four sample sets 170, based on the performance indicators 156 recorded for the call failure samples 152.

To classify a particular call failure sample 150 in one of the sample sets 170, the performance server 140 may be configured to analyze the values of the coverage parameter 158 and the signal quality parameter 160 recorded for the particular call sample 150 and assign the particular call failure sample 150 on one of the sample sets 170 based on the values of the coverage parameter 158 and the signal quality parameter 160. In one embodiment, each sample set 170 is associated with a pre-selected first range of values of the coverage parameter 158 and a pre-selected second range of values of the signal quality parameter. The performance server 140 is configured to assign a particular call sample 150 to a particular sample set 170 when the values of the coverage parameter 158 and the signal quality parameter 160 recorded for the particular call sample 150 falls within the first and second ranges respectively associated with the particular sample set 170. In other words, each particular sample set 170 represents different network conditions experienced by the UEs 102 that recorded the respective call samples 150 classified in the particular sample set 170. In one embodiment, all values of the coverage parameter 158 that equal or exceed a coverage threshold 172 represent good signal coverage and all values of the coverage parameter 158 that that are lower than the coverage threshold 172 represent bad coverage. Similarly, all values of the signal quality parameter 160 that equal or exceed a signal quality threshold 174 represent good signal quality (e.g., low signal interference) and all values of the signal quality parameter 160 that are lower than the signal quality threshold 174 represent bad signal quality (e.g., high signal interference).

For example, the first sample set 170a is associated with values of the coverage parameter 158 that equal or exceed the coverage threshold 172 and values of the signal quality parameter 160 that equal or exceed the signal quality threshold 174. Thus, the first sample set 170a represents good signal coverage and good signal quality. The second sample set 170b, is associated with values of the coverage parameter 158 that equal or exceed the coverage threshold 172 and values of the signal quality parameter 160 that are lower than the signal quality threshold 174. Thus, the second sample set 170b represents good signal coverage but poor signal quality. The third sample set 170c, is associated with values of the coverage parameter 158 that are lower than the coverage threshold 172 and values of the signal quality parameter 160 that are lower than the signal quality threshold 174. Thus, the third sample set 170c represents poor signal coverage as well as poor signal quality. The fourth sample set 170b, is associated with values of the coverage parameter 158 that are lower than the coverage threshold 172 and values of the signal quality parameter 160 that equal or exceed the signal quality threshold 174. Thus, the fourth sample set 170d represents poor signal coverage but good signal quality.

For example, all call samples 150 associated with values of the coverage parameter 158 that equal or exceed the coverage threshold 172 and values of the signal quality parameter 160 that equal or exceed the signal quality threshold 174 are classified/grouped in the first sample set 170*a*. Thus, the first sample set 170*a* represents all call samples 150 that were recorded when the recording UE 102*a* experienced good signal coverage and good signal quality. All call samples 150 associated with values of the coverage parameter 158 that equal or exceed the coverage threshold 172 and values of the signal quality parameter 160 that are lower than the signal quality threshold 174 are classified/grouped in the second sample set 170*b*. Thus, the second sample set 170*b* represents all call samples 150 that were recorded when the recording UE 102*a* experienced good signal coverage but bad signal quality. All call samples 150 associated with values of the coverage parameter 158 that are lower than the coverage threshold 172 and values of the signal quality parameter 160 that are lower than the signal quality threshold 174 are classified/grouped in the third sample set 170*c*. Thus, the third sample set 170*c* represents all call samples 150 that were recorded when the recording UE 102*a* experienced bad signal coverage as well as bad signal quality. All call samples 150 associated with values of the coverage parameter 158 that are lower than the coverage threshold 172 and values of the signal quality parameter 160 that equal or exceed the signal quality threshold 174 are classified/grouped in the fourth sample set 170*d*. Thus, the fourth sample set 170*d* represents all call samples 150 that were recorded when the recording UE 102*a* experienced bad signal coverage but good signal quality.

Figure 2:
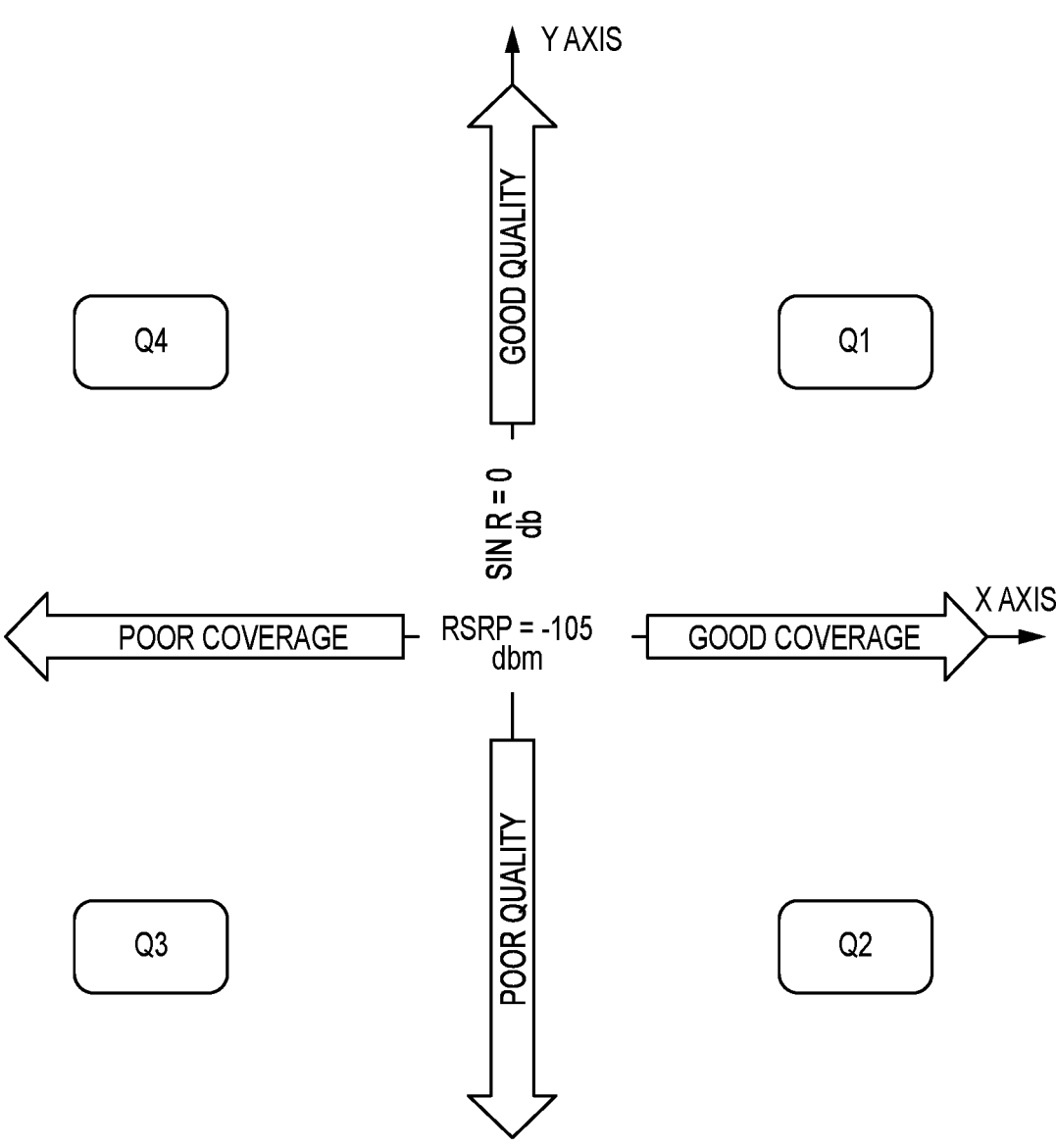
FIG. 2 illustrates a graphical representation of the four sample sets divided based on the values of a coverage parameter and the values of a signal quality parameter, in accordance with one or more embodiments of the present disclosure.

FIG. 2 illustrates a graphical representation of the four sample sets 170 divided based on the values of the coverage parameter 158 (e.g., RSRP) and the values of the signal quality parameter 160 (SINR) as described above. The first sample set 170*a* is represented by the first quadrant (shown as Q1), the second sample set 170*b* is represented by the second quadrant Q2, the third sample set 170*c* is represented by the third quadrant Q3, and the fourth sample set 170*d* is represented by the fourth quadrant Q4. The example illustration of FIG. 2 assumes a coverage threshold of RSRP=−105 dbm and a signal quality threshold of SINR=0 db. As shown, Q1 is associated with values of RSRP that equal or exceed−105 dbm and values of SINR that equal or exceed 0 db. Q2 is associated with values of RSRP that equal or exceed −105 dbm and values of SINR that are lower than 0 db. Q3 is associated with values of RSRP that are lower than −105 dbm and values of SINR that are lower than 0 db. Q4 is associated with values of RSRP that are lower than −105 dbm and values of SINR that equal or exceed 0 db.

Figure 3A:
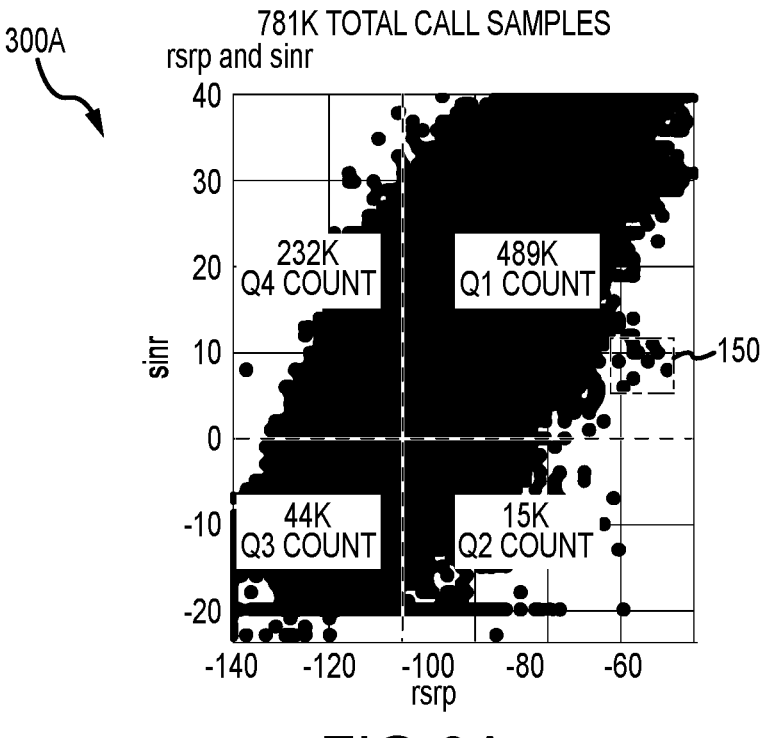
FIG. 3A illustrates an example plot classifying a plurality of call samples in four sample sets, in accordance with one or more embodiments of the present disclosure.

FIG. 3A illustrates an example plot 300A classifying a plurality of call samples 150 (including call failure samples 152) in the four sample sets 170 (e.g., represented by quadrants Q1-Q4) based on the values of the coverage parameter 158 (e.g., RSRP) and the values of the signal quality parameter 160 (SINR) as described above. It may be noted that the call samples 150 shown in the example plot 300A may have been collected by a single UE 102 (e.g., UE 102*a*) or a plurality of UEs 102. As shown in FIG. 3A, a total of 781k call samples 150 are plotted over the four quadrants Q1-Q4 based on the values of RSRP and SINR associated with each of the call samples 150. As shown, out of the 781k call samples 150, 489k call samples 150 are plotted in the quadrant Q1, 15k call samples 150 are plotted in quadrant Q2, 44k call samples 150 are plotted in quadrant Q3, and 232k call samples 150 are plotted in quadrant Q4.

Figure 3B:
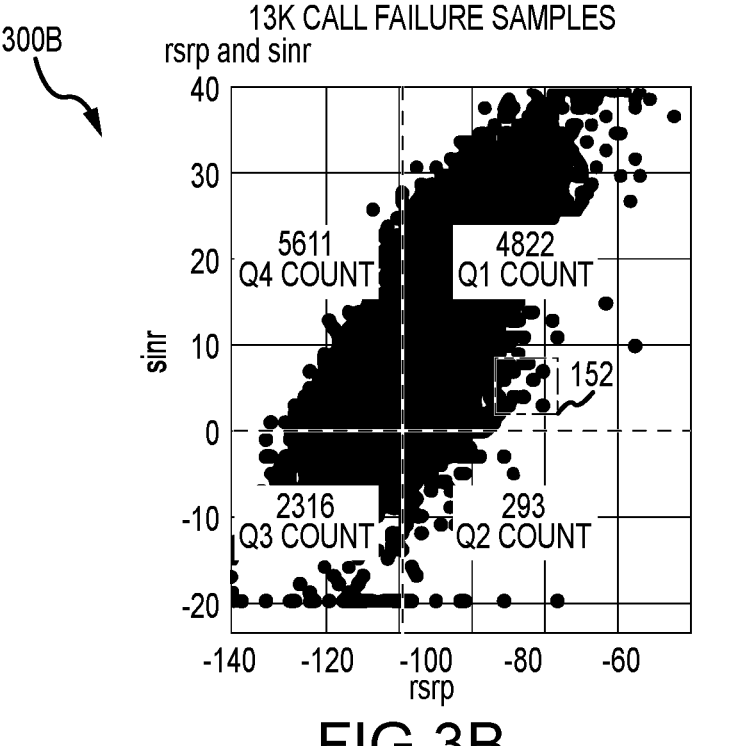
FIG. 3B illustrates an example plot classifying a plurality of call failure samples from the total call samples illustrated in FIG. 3A in the four sample sets, in accordance with one or more embodiments of the present disclosure.

FIG. 3B illustrates an example plot 300B classifying a plurality of call failure samples 152 from the total call samples 150 illustrated in FIG. 3A in the four sample sets 170 e.g., represented by quadrants Q1-Q4) based on the values of the coverage parameter 158 (e.g., RSRP) and the values of the signal quality parameter 160 (SINR) as described above. Example plot 300B plots 13k call failure samples 152 only out of the 781k total call samples 150 plotted in example plot 300A of FIG. 3A. As shown in FIG. 3B, a total of 13k call failure samples 152 are plotted over the four quadrants Q1-Q4 based on the values of RSRP and SINR associated with each of the call failure samples 152. As shown, out of the 13k call failure samples 152, 4822 call failure samples 152 are plotted in the quadrant Q1, 293 call failure samples 152 are plotted in quadrant Q2, 2316 call failure samples 152 are plotted in quadrant Q3, and 5611 call failure samples 152 are plotted in quadrant Q4.

Figure 4:
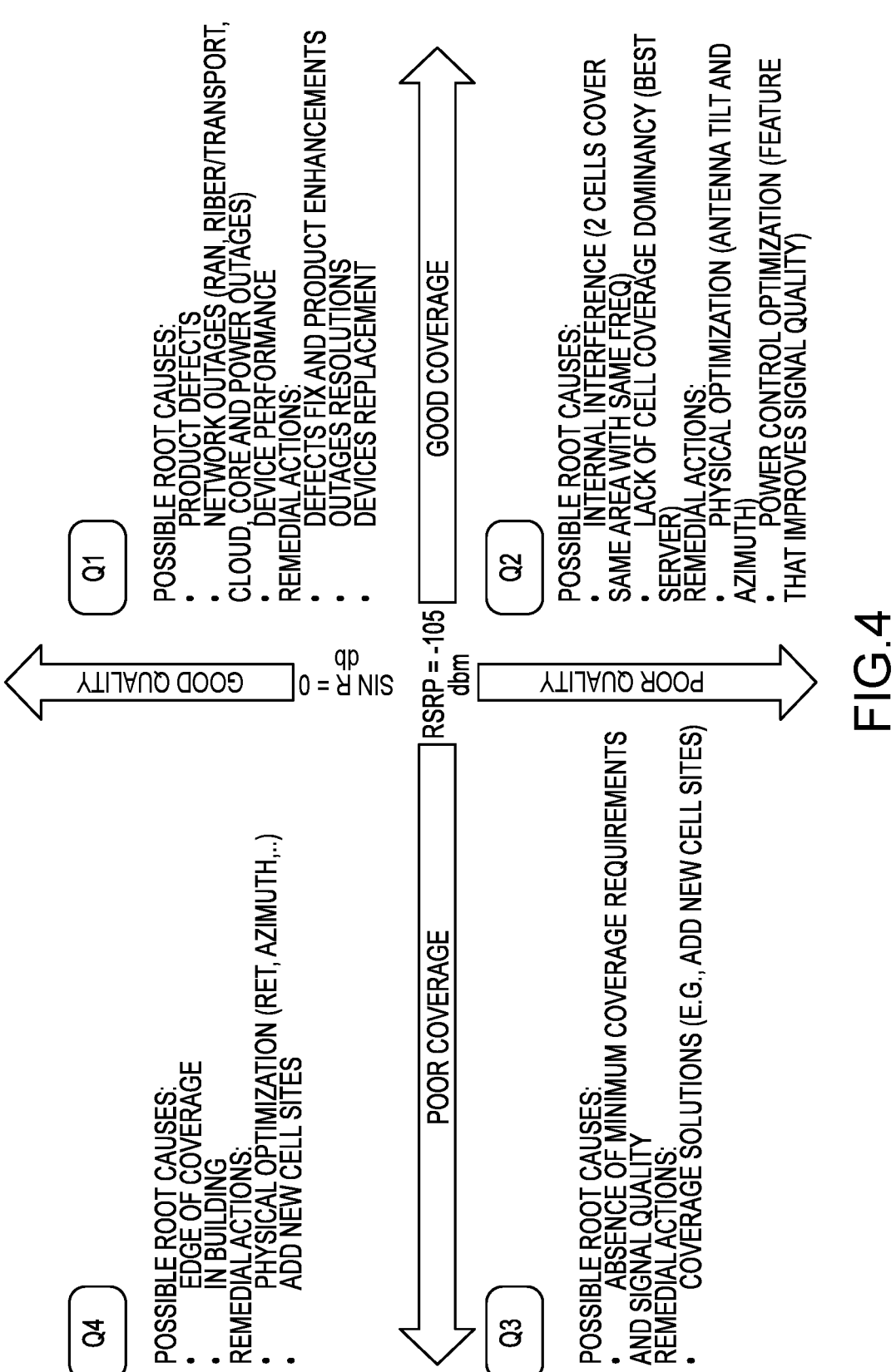
FIG. 4 illustrates example root causes and corresponding remedial actions mapped to each sample set, in accordance with one or more embodiments of the present disclosure.

In one or more embodiments, each sample set 170 is associated with one or more root causes 181 and one or more remedial actions 182 that can be implemented to resolve one or more of the root causes 181. The root causes 181 associated with a particular sample set 170 include the most likely root causes of call failure events 154 associated with call failure samples 152 assigned to the particular sample set 170. FIG. 4 illustrates example root causes 181 and corresponding remedial actions 182 mapped to each sample set 170*a*-170*d* which are represented by quadrants Q1-Q4 respectively.

As shown, the possible root causes of call failure events 154 associated with corresponding call failure samples 152 plotted/assigned to the first sample set 170*a* (represented by Q1) recorded under good coverage and good signal quality conditions include product defects associated with a UE 102 that recorded the call failure samples 152, network outages (e.g., RAN outage, fiber line outage, cloud outage, core outage, and/or power outages), and/or device performance of the device that recorded the call failure samples 152. The remedial actions 182 mapped to the first sample set/Q1 includes fixing defects detected in the device (e.g., UE 102) that recorded the call failure samples 152, resolve network outages that caused the call failure events 154, and/or replace the device (e.g., UE 102) that recorded the call failure samples 152.

The possible root causes of call failure events 154 associated with corresponding call failure samples 152 plotted/assigned to the second sample set 170*b* (represented by Q2) recorded under good coverage conditions but bad signal quality conditions include cell interference (e.g., two cells cover a same area using the same frequency) and/or lack of cell coverage dominancy (e.g., the cell site transmits signals with insufficient power to counter radio signals transmitted in neighboring cells). The remedial actions 182 mapped to the second sample set/Q2 include physical optimization which includes modifying antenna tilt/azimuth associated with one or more antennas at a cell site 104 to counter/avoid cell interference from neighboring cells, and/or power control optimization which may include increasing transmission power of radio signals transmitted by a cell site 104 to establish cell coverage dominancy.

The possible root causes of call failure events 154 associated with corresponding call failure samples 152 plotted/assigned to the third sample set 170*c* (represented by Q3) recorded under bad coverage conditions as well as bad signal quality conditions include absence of minimum coverage requirements and signal quality requirements at a location where the UE 102 recorded the call failure samples 152. The remedial actions 182 mapped to the third sample set/Q3 include providing coverage solutions including add-
ing new cell sites to provide improved cell coverage to the
location where the UE 102 recorded the call failure samples
152.

The possible root causes of call failure events 154 asso-
ciated with corresponding call failure samples 152 plotted/
assigned to the fourth sample set 170d (represented by Q4)
recorded under bad coverage conditions but good signal
quality conditions include a UE 102 that recorded the call
failure samples 152 is located at a cell edge (e.g., edge of cell
coverage) associated with a cell site 104. Another possible
root cause mapped to the third sample set 170c/Q3 includes
a UE 102 that recorded the call failure samples 152 is
located inside a building where penetration of radio signals
from a cell site 104 is minimal. The remedial actions 182
mapped to the fourth sample set/Q4 include physical opti-
mization which may include modifying antenna tile/azimuth
of one or more radio antennas of the cell site 104 (e.g., using
remote electrical tilt (RET)) to cause signal transmission in
the direction of a location where the UE 102 recorded the
call failure samples 152, and/or add new cell sites 104 to
provide improved cell coverage to the location where the UE
102 recorded the call failure samples 152.

In one or more embodiments, once the call failure samples
152 have been classified/grouped into the sample sets 170a-
170d, the performance server 140 may be configured to
identify one or more root causes 181 that caused call failure
events 154 associated with the call failure samples 152 and
provide recommendations of remedial actions 182 that need
to be implemented to resolve the identified root causes 181.
For example, when one or more call failure samples 152 are
assigned to a particular sample set 170, the performance
server 140 obtains (e.g., accesses from memory 146) the
possible root causes 181 mapped to the particular sample set
and the corresponding remedial actions 182 for each of the
root causes 181. The performance server 140 may generate
a report 183 that includes the possible root causes 181
mapped to the particular sample set 170 and a recommen-
dation 184 of a corresponding remedial action 182 for each
of the root causes 181. The report 183 generated by the
performance server 140 may be used as a guidance by a
network operator associated with the cellular network 110 to
identify and resolve one or more root causes 181 that caused
the call failure events 154 to occur.

In one example use case, the performance server 140 may
obtain (e.g., from cloud service 120) a plurality of call
samples 150 (including call failure samples 152) that include
call samples 150 collected by a plurality of types of UEs
102, wherein each type of UE 102 corresponds to a particu-
lar make and model of UE 102. For example, the call
samples 150 may include call samples 150 collected by a
plurality of different models of smartphones. It may be noted
that the call samples 150 collected by a particular type of UE
102 may include call samples collected a plurality of UEs of
the same type across a sample geographical region (e.g.,
geographical region 112). For example, the call samples 150
collected by a particular make and model of smartphone
may include call samples 150 collected by a plurality of
smartphones of the same particular make and model across
a sample geographical region (e.g., geographical region
112). The performance server 140 may be configured to
separately classify the call samples 150 associated with each
type of UE 102 (e.g., each model of smartphone) into the
sample sets 170a-170d as described above with reference to
FIGS. 2, 3A and 3B. Additionally, for each type of UE 102
(e.g., each model of smartphone), the performance server
140 may be configured to separately classify the total call samples 150 into the sample sets 170 (as shown in FIG. 3A)
and the call failure samples 152 only from the total call
samples 150 (as shown in FIG. 3B). Once the call samples
150 and the call failure samples 152 collected by each type
of UE 102 are classified separately, for each type of UE 102a
the performance server 140 may calculate a percentage call
failure rate associated with call failure samples 152 assigned
to the first sample set 170a (shown as Q1 in FIG. 2). For
example, for call samples 150 collected by a particular type
of UE, the performance server 140 may calculate a percent-
age call failure rate in Q1 by dividing a number of call
failure samples 152 assigned to Q1 by the total number of
call samples 150 assigned to Q1 and by multiplying a result
of this division by 100. For example, referring to FIGS. 3A
and 3B the percentage call failure rate associated with call
failure samples 152 plotted to Q1 may be calculated as [4822
(Q1 of plot 300B)/489000 (Q1 of plot 300A)]×100=0.99%.
The performance server 140 may be configured to calculate
a percentage call failure rate associated with Q1 call failure
samples 150 collected by each type of UE 102.

The performance server 140 obtains (e.g., accesses from
memory 146) the possible root causes 181 mapped to the
first sample set 170a and the corresponding remedial actions
182 for each of the root causes 181. As described above with
reference to FIG. 4, the possible root causes associated with
call failure samples 152 that are assigned to the first sample
set 170a/Q1 (where the call failure samples 152 were
recorded in good coverage and signal quality conditions)
include device issues (e.g., device defects and/or device
performance) or network outage. When the Q1 percentage
call failure rate calculated for a particular type of UE 102
(e.g., particular make and model of smartphone) is above a
pre-set threshold, the performance server 140 may be con-
figured to determine that the root cause of call failure events
154 associated with the particular type of UE 102 is device
performance. The idea here is that when a particular type of
UE consistently performs poorly (e.g., consistently associ-
ated with call drops and/or call setup failure events) in good
coverage and good signal quality conditions across several
cell sites 104 deployed over a geographical region 112, the
root cause of the call failure events is most likely device
performance and/or a defect associated with the particular
type of UE. After determining that the root cause of call
failure events 154 associated with the particular type of UE
102 is device performance, the performance server 140 may
generate a report 183 that includes the determination that the
root cause of call failure events 154 recorded by the par-
ticular type of UE 102 is device performance and a recom-
mendation 184 of a corresponding remedial action 182 (e.g.,
device enhancements, device replacement etc.) for resolving
the identified root cause. The report 183 generated by the
performance server 140 may be used as a guidance by a
network operator associated with the cellular network 110
and/or device manufacturer to identify and resolve the
device performance issues associated with the particular
type of UE 102.

Deployment of New Cell Sites

The performance server 140 may be configured to deter-
mine an impact that deploying a potential/proposed new cell
site may have in improving call failure issues occurring at a
geographical location where the potential new cell site is
proposed for deployment, and further determine whether the
potential new cell site is to be deployed at the geographical
location based on a determined degree of impact associated
with deploying the potential new cell site. In this context, the
performance server 140 obtains information relating to one
or more potential new cell sites 178 that are proposed for deployment, wherein the information relating to each potential new cell site 178 includes a proposed geolocation 179 at which the potential new cell site 178 is proposed for deployment. Generally, a network operator identifies a plurality of potential new cell sites for deployment using several factors including, but not limited to, ease of land acquisition, deployment permissions, and/or customer complaints of low cell coverage. However, the costs associated with deployment of new cell sites is quite high, and thus, certain new cell site deployments need to be prioritized over others to reduce deployment costs. Embodiments of the present disclosure describe techniques to analyze call failure data collected in the vicinity of locations where the potential new cell sites 178 are proposed for deployment and recommends those potential new cell sites 178 for deployment that are determined to provide sufficient improvement in call failure issues in an impacted area to warrant the deployment. The idea here is that, if a potential new cell site 178 alleviates sufficient call failure issues in an impacted area, then it may be worth going forward with the investment associated with deploying the potential new cell site 178. In other words, the described techniques identify those potential new cell sites 178 for deployment that provide the highest benefits to users. This allows prioritization of deployment of potential new cell sites 178 in areas that are most impacted by poor network performance.

As described in further detail below, to determine an impact of deploying a potential new cell site 178 at a proposed geolocation 179, the performance server analyzes call failure samples 152 recorded in the vicinity of the proposed geolocation 179. As described below, the performance server only considers and analyzes call failure samples 152 that are assigned to the third sample set 170*c* (e.g., Q3 shown in FIG. 2) and the fourth sample set 170*d* (e.g., Q4 shown in FIG. 2) since only those call failure samples 152 that are assigned to the third sample set 170*c*/Q3 and the fourth sample set 170*d*/Q4 are reliable indicators of network performance issues (e.g., poor coverage) in areas where these call failure samples 152 were collected. On the other hand, call failure samples 152 assigned to the first sample set 170*a*/Q1 and the second sample set 170*b*/Q2 are not reliable indicators of poor network coverage because the call failure events 154 associated with call failure samples 152 assigned to the first sample set 170*a*/Q1 and the second sample set 170*b*/Q2 are most likely caused by product issues, network outages, and/or signal interference and not by poor network coverage.

To analyze the call failure samples 152 in the vicinity of a proposed geolocation 179 of a potential new cell site 178, the performance server 140 digitally plots on a geographical map 176 call failure samples 152 recorded by UEs 102 in the vicinity of the proposed geolocation 179. The geographical map 176 may be a virtual map (e.g., digital map) of a region within which the potential new cell site 178 is proposed for deployment. It may be noted that the call failure samples 152 mapped on the geographical map 176 may include call failure samples 152 recorded by a single type of UE 102 (e.g., a plurality of smartphones of the same make and model) or recorded by a plurality of types of UEs 102 (e.g., a plurality of smartphones of different makes and models). As described above, each call sample 150 (including call failure samples 152) include a geolocation 162 at which a recording UE 102 recording the call sample 150. Plotting a particular call failure sample 152 on the map 176 includes plotting the particular call failure sample 152 at a location on the map 176 that represents the geolocation 162 associated with the call failure sample 152.

In addition to plotting the call failure samples 152 on the map 176, performance server 140 may also be configured to digitally plot the locations of one or more potential new cell sites 178 on the map 176. For example, performance server 140 obtains the proposed geolocations 179 associated with one or more potential new cell sites 178 proposed for deployment in a particular region (e.g., city, county, neighborhood etc.) and plots the potential new cell sites on the map 176 at the respective proposed geolocations 179.

Figures 5A, 5B, 5C:
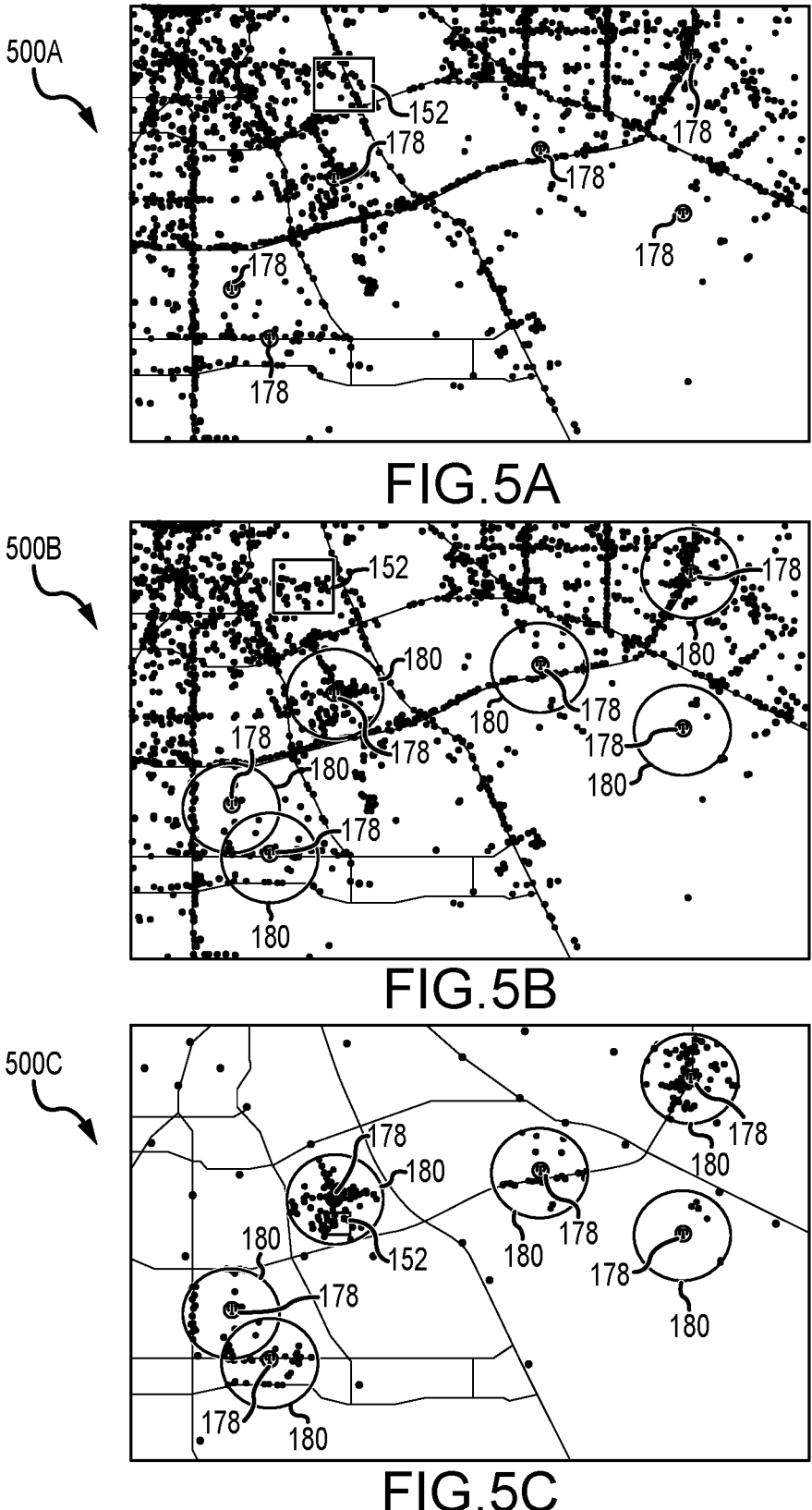
FIG. 5A illustrates a plot showing call failure samples and potential new cell sites plotted on a geographical map, in accordance with one or more embodiments of the present disclosure.
FIG. 5B illustrates a plot in which an enclosed buffer area has been selected around each potential new cell site of FIG. 5A, in accordance with one or more embodiments of the present disclosure.
FIG. 5C illustrates a plot in which all call failure samples that are plotted outside the buffer areas shown in FIG. 5B have been deleted and only those call failure samples have been selected that are enclosed within the buffer areas of the respective potential new cell sites, in accordance with embodiment of the present disclosure.

FIG. 5A illustrates a plot 500A showing call failure samples 152 and potential new cell sites 178 plotted on the geographical map 176, in accordance with one or more embodiments of the present disclosure. It may be noted that each circular dot shown in the plot 500A represents a distinct call failure sample 152.

Once the call failure samples 152 and the potential new cell sites 178 are plotted on the map 176, performance server 140 selects on the map 176 an enclosed buffer area 189 around each potential new cell site 178 plotted on the map 176. The enclosed buffer area 189 associated with a potential new cell site 178 represents an estimated cell coverage of the potential new cell site 178. In one embodiment, an identical pre-selected buffer area 180 may be selected for all potential new cell sites 178. In an alternative embodiment, different potential new cell sites 178 may have a different shape and/or size of the buffer area 180. FIG. 5B illustrates a plot 500B in which an enclosed buffer area 180 has been selected around each potential new cell site 178.

Once an enclosed buffer area 180 has been selected in the map 176 around each potential new cell site 178, the performance server 140 is configured to select only those call failure samples 152 that are enclosed within the buffer areas 180 of the respective potential new cell sites 178. For example, performance server 140 deletes all call failure samples 152 that are plotted on the map 176 outside the buffer areas 180. FIG. 5C illustrates a plot 500C in which all call failure samples 152 that are plotted outside the buffer areas 180 have been deleted and only those call failure samples 152 have been selected that are enclosed within the buffer areas 180 of the respective potential new cell sites 178. For each potential new cell site 178, the performance server 140 records a number (N) of all call failure samples 152 enclosed within the respective buffer area 180.

In one embodiment, in order to select the call failure samples 152 enclosed in the respective buffer areas 180 of the potential new cell sites 178, the performance server 140 generates a first map layer including all call failure samples 152 plotted on a first copy of the map 176. The performance server 140 also generates a second map layer including the potential new cell sites 178 and the respective buffer areas 180 plotted on a second copy of the map 176. The performance server 140 geospatially overlaps the first map layer and the second map layer. For each potential new cell site 178, the performance server 140 and selects the call failure samples 152 in a portion of the first map layer that overlaps with the respective buffer area of the new cell site 178.

Among the selected call failure samples 152 within the buffer areas 180 of the respective potential new cell sites 178, the performance server 140 further selects only those call failure samples 152 that are assigned to the third sample set 170*c* (shown as Q3 in FIG. 2) and the fourth sample set 170*d* (shown as Q4 in FIG. 2). The assumption here is that the call failure samples 152 plotted on the map 176 have already been analyzed and assigned to the sample sets 170. As described above and illustrated in FIGS. 2, both the third sample set 170*c*/Q3 and the fourth sample set 170*d*/Q4 include call samples 150 (including call failure samples 152)

that are associated with poor coverage (e.g., coverage parameter 158 lower than coverage threshold 172). Thus, the call failure samples 152 assigned to the third sample set 170c/Q3 and the fourth sample set 170d/Q4 are reliable indicators of call failure events 154 recorded in poor coverage conditions. For each potential new cell site 178, the performance server 140 records a number (n) of call failure samples 152 that are enclosed within the respective buffer area 180 and are assigned to the third sample set 170c/Q3 and the fourth sample set 170d/Q4.

For each potential new cell site 178 plotted on the map 176, the performance server 140 calculates a percentage contribution (P) 188 of the call failure samples 152 assigned to the third sample set 170c/Q3 and the fourth sample set 170d/Q4 among all call failure samples enclosed in the respective buffer area 180 of the potential new cell site 178. For example, performance server 140 calculates P as P=(n/N)×100. Referring to the example plot 300B of FIG. 3B, the total call failure samples 152 assigned to quadrants Q3 and Q4 is (2316+5611)=7927. The total call failure samples 152 assigned to all four quadrants is 13k. Thus, P=[(2316+5611)/13000]×100=60.99%.

Performance server 140 may be configured to determine whether a particular potential new cell site 178 is to be deployed at a respective proposed geolocation 179 based on the percentage contribution (P) 188 calculated for the particular potential new cell site 178 and the number (n) of call failure samples 152 enclosed in the respective buffer area 180 that are assigned to the third sample set 170c/Q3 and the fourth sample set 170d/Q4. The combination of the percentage contribution (P) 188 calculated for the particular potential new cell site 178 and the number (n) of call failure samples 152 enclosed in the respective buffer area 180 that are assigned to the third sample set 170c/Q3 and the fourth sample set 170d/Q4 represent an impact of deploying the particular potential new cell site 178 in improving call failure issues recorded in the vicinity of the respective proposed geolocation 179. In one embodiment, when the values of P and n associated with the particular potential new cell site 178 equal or exceed a first threshold and a second threshold respectively, performance server 140 determines that the impact of deploying the particular potential new cell site 178 is sufficiently large to warrant deployment of the potential new cell site 178. On the other hand, when one or both of P and n associated with the particular potential new cell site 178 are lower than their respective thresholds, performance server 140 determines that the impact of deploying the particular potential new cell site 178 is not sufficiently large to warrant deployment of the potential new cell site 178.

Accordingly, performance server 140 may be configured to determine that a particular potential new cell site 178 is to be deployed when the values of P and n associated with the particular potential new cell site 178 equal or exceed a first threshold and a second threshold respectively. Alternatively, performance server 140 may be configured to determine that a particular potential new cell site 178 is not to be deployed when the values of one or both of P and n associated with the particular potential new cell site 178 are lower than their respective thresholds. Thus, in other words, the performance server 140 uses the combined condition of P equals or exceeds the first threshold and n equals or exceeds the second threshold as the minimum criteria for deployment of a potential new cell site 178 at a respective proposed geolocation 179.

In one or more embodiments, when multiple potential new cell sites 178 in a selected region are determined to satisfy the minimum criteria described above for deployment, performance server 140 may be configured to rank the potential new cell sites 178 that satisfy the minimum criteria based on the values of percentage contributions (P) 188 calculated for the potential new cell sites 178. In one embodiment, the performance server 140 selects the potential new cell sites 178 that satisfy the minimum criteria and ranks the selected potential new cell sites based on the respective percentage contributions (P) 188 calculated for the selected potential new cell sites 178, wherein a higher rank is assigned to a potential new cell sites 178 having a higher respective percentage contribution (P) 188. In one embodiment, the performance server 140 determines that a pre-selected number of the highest ranked potential new cell sites 178 are to be deployed at respective proposed geolocations 179.

In one embodiment, the call failure samples 152 analyzed to determine deployment decisions relating to potential new cell sites 178 as described above include only those call failure samples 152 recorded by one or more best performing types of UEs 102 (e.g., best performing smartphone makes and models). For example, to make a deployment decision relating to a particular potential new cell site 178, the performance server 140 may analyze call failure samples 152 recorded by a particular type of UE 102 (e.g., particular make/model/version of smartphone) that recorded a least number of call failure samples 152 compared to call failure samples 152 recorded by other types of UEs. For example, as described above with reference to FIGS. 3A and 3B, the performance server 140 calculates a call failure rate for each type of UE 102 that collected call failure samples 152 and considers only those call failure samples 152 that were collected by a UE 102 associated with a lowest call failure rate.

FIG. 6 is a flowchart of an example method 600 for resolving call failures in a cellular network 110, in accordance with embodiments of the present disclosure. Method 600 may be performed by the performance server 140 as shown in FIG. 1 and described above.

At operation 602, the performance server 140 accesses, from the memory 146, data relating to call failures. The data relating to call failures includes a plurality of call failure samples 152. Each call failure sample 152 is associated with a wireless call placed from a particular user equipment (UE) 102. Each call failure sample 152 is associated with a call failure event 154. Each call failure event 154 comprises a call drop event 154a or a call setup failure event 154b. A coverage parameter 158 is associated with each call failure sample 152, wherein each coverage parameter 158 indicates a power associated with a network signal measured by a particular UE 102. A signal quality parameter 160 is associated with each call failure sample, wherein each signal quality parameter 160 indicates a quality of a network signal measured by a particular UE 102.

As described above, UEs 102 that are connected to the cellular network 110 may be used to collect data associated with a plurality of parameters associated with calls placed by the UEs 102 and/or received by the UEs 102. For example, a UE 102a (e.g., a smartphone) that is connected to the cellular network 110 may be used to collect data associated with a plurality of performance indicators 156, wherein each performance indicator 156 indicates performance of the cellular network 110. In one embodiment, for each voice/data call placed or received by the UE 102a, a software plug-in 106 operating at the UE 102a may be configured to collect data relating to a plurality of performance indicators 156 that indicate performance of the cellular network 110.

The performance indicators 156 may include a coverage parameter 158 that indicates a power associated with a network signal measured by the UE 102*a*. For example, the UE 102*a* may be configured to measure the power of the radio signal received from a cell tower of a cell site 104*a* that the UE 102*a* is connected to. In one example, the coverage parameter includes Reference Signal Received Power (RSRP). The performance indicators 156 recorded by the UE 102*a* may additionally include a signal quality parameter 160 that indicates a quality of a network signal measured by the UE 102*a*. The signal quality parameter 160 indicates a degree of interference experienced by the UE 102*a* from other nearby UEs 102 and/or cell sites 104 operating in the cellular network 110. In one example, the signal quality parameter 160 includes Signal to Interference Noise Ratio (SINR). Other parameters collected by the UE 102*a* relating to a call event as part of a respective call sample 150 may include, but are not limited to, date and time of the call event, a unique call identity (ID) for the call event, a device ID associated with the UE 102*a*, make and model of the UE 102*a*, a geolocation 162 of the UE 102*a* at the time of the call event, a cell ID associated with the cell site 104*a* the UE 102*a* is connected to, a cell site ID of the cell site 104*a*.

In addition, for each call event, a UE 102 may record whether the call placed or received by the UE 102*a* was successful or failed. Each call event that results in a failed call may be referred to as a call failure event 154. A call failure event 154 may include a call drop event 154*a* or a call setup failure event 154*b*. A call drop event 154*a* refers to a call event in which a an active/ongoing call between two parties (e.g., UEs 102) cuts off involuntarily. A call setup failure event 154*b* refers to a call event in which a connection fails to establish between a calling party (e.g., a UE 102) and a called party (e.g., another UE 102). In one embodiment, for each call failure event 154, the UE 102 may further record, as part of the respective call sample 152 associated with the call failure event 154, whether the call failure event 154 was a call drop event 154*a* or a call setup failure event 154*b*. A call sample 150 associated with a call failure event 154 may be referred to as a call failure sample 152. Thus, the overall call samples 150 collected by the UE 102*a* may include one or more call failure samples 152, wherein each call failure sample 152 includes data relating to parameters associated with a particular call failure event 154 (e.g., a call drop event 154*a* or a call setup failure event 154*b*).

Thus, each call sample 150 (including call failure samples 152) recorded at the UE 102*a* includes data relating to one or more RSRP measurements, one or more SINR measurements, date and time of the call event, a unique call identity (ID) for the call event, a device ID associated with the UE 102*a*, make and model of the UE 102*a*, a geolocation 162 of the UE 102*a* at the time of the call event, a cell ID associated with the cell site 104*a* the UE 102*a* is connected to, a cell site ID of the cell site 104*a*, whether the call placed or received by the UE 102*a* was successful or failed, or whether the call failure event 154 was a call drop event 154*a* or a call setup failure event 154*b*.

Each UE 102 that records call samples 150 may be configured to store the recorded call samples 150 in a database 122 (e.g., SQL Database) that is connected to the data network 130. For example, UE 102*a* may be configured to store call samples 150 in the database 122. In one embodiment, the database 122 may be hosted in a cloud service 120 and may be part of cloud storage provided by the cloud service 120.

In one or more embodiments, the performance server 140 may have access to the performance data relating to the call samples 150 collected using one or more UEs 102 such as UE 102*a*. In one embodiment, performance server 140 may (e.g., periodically or when needed) extract at least a portion of the data related to the call samples 150 stored in the database 122 from the cloud service 120 and store locally in memory 146. For example, performance server 140 may extract call samples 150 collected by a particular UE 102*a* and store locally in memory 146.

At operation 604, the performance server 140 classifies the plurality of call failure samples 152 into a plurality of sets (e.g., samples sets 170) of the call failure samples 152, wherein each sample set 170 of the call failure samples 152 is associated with a first range of values of the coverage parameter 158 and a second range of values of the signal quality parameter 160.

As described above, to facilitate efficient and accurate identification of root causes associated with call failure events 154 recorded in the cellular network 110 and to allow for quick and effective resolution of the identified root causes, the performance server 140 may be configured to classify the call samples 150 (including the call failure samples 152) into several sample sets 170 based on the respective performance indicators 156 recorded for the call samples 150. For example, based on the performance indicators 156 recorded for each call sample 150, the performance server 140 generates four sample sets 170 and divides the call samples into the four sample sets 170 including first sample set 170*a*, a second sample set 170*b*, a third sample set 170*c* and a fourth sample set 170*d*. In an additional or alternative embodiment, as described below with reference to FIG. 3B, the performance server 140 separately classifies all call failure samples 152 into the four sample sets 170, based on the performance indicators 156 recorded for the call failure samples 152.

To classify a particular call failure sample 150 in one of the sample sets 170, the performance server 140 may be configured to analyze the values of the coverage parameter 158 and the signal quality parameter 160 recorded for the particular call sample 150 and assign the particular call failure sample 150 on one of the sample sets 170 based on the values of the coverage parameter 158 and the signal quality parameter 160. In one embodiment, each sample set 170 is associated with a pre-selected first range of values of the coverage parameter 158 and a pre-selected second range of values of the signal quality parameter. The performance server 140 is configured to assign a particular call sample 150 to a particular sample set 170 when the values of the coverage parameter 158 and the signal quality parameter 160 recorded for the particular call sample 150 falls within the first and second ranges respectively associated with the particular sample set 170. In other words, each particular sample set 170 represents different network conditions experienced by the UEs 102 that recorded the respective call samples 150 classified in the particular sample set 170. The classification of the call failure samples 152 into the four samples sets 170*a-d* is described in detail above and the description will not be repeated here.

At operation 606, the performance server 140 obtains one or more remedial actions 182 associated with a particular set (e.g., sample set 170) of the call failure samples 152, wherein each sample set 170 of the call failure samples 152 is associated with respective at least one remedial action 182.

At operation 608, the performance server 140 generates an indication (e.g., report 183) that the one or more remedial actions 182 is to be performed to resolve call failure events 154 associated with call failure samples 152 in the particular set (e.g., sample set 170) of the call failure samples 152.

As described above, in one or more embodiments, each sample set 170 is associated with one or more root causes 181 and one or more remedial actions 182 that can be implemented to resolve one or more of the root causes 181. The root causes 181 associated with a particular sample set 170 include the most likely root causes of call failure events 154 associated with call failure samples 152 assigned to the particular sample set 170. FIG. 4 illustrates example root causes 181 and corresponding remedial actions 182 mapped to each sample set 170a-170d which are represented by quadrants Q1-Q4 respectively.

As shown, the possible root causes of call failure events 154 associated with corresponding call failure samples 152 plotted/assigned to the first sample set 170a (represented by Q1) recorded under good coverage and good signal quality conditions include product defects associated with a UE 102 that recorded the call failure samples 152, network outages (e.g., RAN outage, fiber line outage, cloud outage, core outage, and/or power outages), and/or device performance of the device that recorded the call failure samples 152. The remedial actions 182 mapped to the first sample set/Q1 includes fixing defects detected in the device (e.g., UE 102) that recorded the call failure samples 152, resolve network outages that caused the call failure events 154, and/or replace the device (e.g., UE 102) that recorded the call failure samples 152.

The possible root causes of call failure events 154 associated with corresponding call failure samples 152 plotted/assigned to the second sample set 170b (represented by Q2) recorded under good coverage conditions but bad signal quality conditions include cell interference (e.g., two cells cover a same area using the same frequency) and/or lack of cell coverage dominancy (e.g., the cell site transmits signals with insufficient power to counter radio signals transmitted in neighboring cells). The remedial actions 182 mapped to the second sample set/Q2 include physical optimization which includes modifying antenna tilt/azimuth associated with one or more antennas at a cell site 104 to counter/avoid cell interference from neighboring cells, and/or power control optimization which may include increasing transmission power of radio signals transmitted by a cell site 104 to establish cell coverage dominancy.

The possible root causes of call failure events 154 associated with corresponding call failure samples 152 plotted/assigned to the third sample set 170c (represented by Q3) recorded under bad coverage conditions as well as bad signal quality conditions include absence of minimum coverage requirements and signal quality requirements at a location where the UE 102 recorded the call failure samples 152. The remedial actions 182 mapped to the third sample set/Q3 include providing coverage solutions including adding new cell sites to provide improved cell coverage to the location where the UE 102 recorded the call failure samples 152.

The possible root causes of call failure events 154 associated with corresponding call failure samples 152 plotted/assigned to the fourth sample set 170d (represented by Q4) recorded under bad coverage conditions but good signal quality conditions include a UE 102 that recorded the call failure samples 152 is located at a cell edge (e.g., edge of cell coverage) associated with a cell site 104. Another possible root cause mapped to the third sample set 170c/Q3 includes a UE 102 that recorded the call failure samples 152 is located inside a building where penetration of radio signals from a cell site 104 is minimal. The remedial actions 182 mapped to the fourth sample set/Q4 include physical optimization which may include modifying antenna tile/azimuth of one or more radio antennas of the cell site 104 (e.g., using remote electrical tilt (RET)) to cause signal transmission in the direction of a location where the UE 102 recorded the call failure samples 152, and/or add new cell sites 104 to provide improved cell coverage to the location where the UE 102 recorded the call failure samples 152.

In one or more embodiments, once the call failure samples 152 have been classified/grouped into the sample sets 170a-170d, the performance server 140 may be configured to identify one or more root causes 181 that caused call failure events 154 associated with the call failure samples 152 and provide recommendations of remedial actions 182 that need to be implemented to resolve the identified root causes 181. For example, when one or more call failure samples 152 are assigned to a particular sample set 170, the performance server 140 obtains (e.g., accesses from memory 146) the possible root causes 181 mapped to the particular sample set and the corresponding remedial actions 182 for each of the root causes 181. The performance server 140 may generate a report 183 that includes the possible root causes 181 mapped to the particular sample set 170 and a recommendation 184 of a corresponding remedial action 182 for each of the root causes 181. The report 183 generated by the performance server 140 may be used as a guidance by a network operator associated with the cellular network 110 to identify and resolve one or more root causes 181 that caused the call failure events 154 to occur.

FIG. 7 is a flowchart of an example method 700 for making deployment decisions relating to new cell sites, in accordance with embodiments of the present disclosure. Method 700 may be performed by the performance server 140 as shown in FIG. 1 and described above.

At operation 702, the performance server 140 accesses from the memory 146 data relating to call failures. The data relating to call failures includes a plurality of call failure samples 152. Each call failure sample 152 is associated with a wireless call placed from a particular user equipment (UE). Each call failure sample 152 is associated with a call failure event 154. Each call failure event 154 comprises a call drop event 154a or a call setup failure event 154b. A coverage parameter 158 is associated with each call failure sample 152, wherein each coverage parameter 158 indicates a power associated with a network signal measured by a particular UE 102. A signal quality parameter 160 is associated with each call failure sample 152, wherein each signal quality parameter 160 indicates a quality of a network signal measured by a particular UE 102. Each call failure sample 152 is associated with a geolocation 162, wherein the geolocation 162 associated with a call failure sample 152 indicates a geographical location where a respective call failure event 154 is recorded.

As described above, UEs 102 that are connected to the cellular network 110 may be used to collect data associated with a plurality of parameters associated with calls placed by the UEs 102 and/or received by the UEs 102. For example, a UE 102a (e.g., a smartphone) that is connected to the cellular network 110 may be used to collect data associated with a plurality of performance indicators 156, wherein each performance indicator 156 indicates performance of the cellular network 110. In one embodiment, for each voice/data call placed or received by the UE 102a, a software plug-in 106 operating at the UE 102a may be configured to collect data relating to a plurality of performance indicators 156 that indicate performance of the cellular network 110. The performance indicators 156 may include a coverage parameter 158 that indicates a power associated with a network signal measured by the UE 102a. For example, the UE 102a may be configured to measure the power of the radio signal received from a cell tower of a cell site 104a that the UE 102a is connected to. In one example, the coverage parameter includes Reference Signal Received Power (RSRP). The performance indicators 156 recorded by the UE 102a may additionally include a signal quality parameter 160 that indicates a quality of a network signal measured by the UE 102a. The signal quality parameter 160 indicates a degree of interference experienced by the UE 102a from other nearby UEs 102 and/or cell sites 104 operating in the cellular network 110. In one example, the signal quality parameter 160 includes Signal to Interference Noise Ratio (SINR). Other parameters collected by the UE 102a relating to a call event as part of a respective call sample 150 may include, but are not limited to, date and time of the call event, a unique call identity (ID) for the call event, a device ID associated with the UE 102a, make and model of the UE 102a, a geolocation 162 of the UE 102a at the time of the call event, a cell ID associated with the cell site 104a the UE 102a is connected to, a cell site ID of the cell site 104a.

In addition, for each call event, a UE 102 may record whether the call placed or received by the UE 102a was successful or failed. Each call event that results in a failed call may be referred to as a call failure event 154. A call failure event 154 may include a call drop event 154a or a call setup failure event 154b. A call drop event 154a refers to a call event in which a an active/ongoing call between two parties (e.g., UEs 102) cuts off involuntarily. A call setup failure event 154b refers to a call event in which a connection fails to establish between a calling party (e.g., a UE 102) and a called party (e.g., another UE 102). In one embodiment, for each call failure event 154, the UE 102 may further record, as part of the respective call sample 152 associated with the call failure event 154, whether the call failure event 154 was a call drop event 154a or a call setup failure event 154b. A call sample 150 associated with a call failure event 154 may be referred to as a call failure sample 152. Thus, the overall call samples 150 collected by the UE 102a may include one or more call failure samples 152, wherein each call failure sample 152 includes data relating to parameters associated with a particular call failure event 154 (e.g., a call drop event 154a or a call setup failure event 154b).

Thus, each call sample 150 (including call failure samples 152) recorded at the UE 102a includes data relating to one or more RSRP measurements, one or more SINR measurements, date and time of the call event, a unique call identity (ID) for the call event, a device ID associated with the UE 102a, make and model of the UE 102a, a geolocation 162 of the UE 102a at the time of the call event, a cell ID associated with the cell site 104a the UE 102a is connected to, a cell site ID of the cell site 104a, whether the call placed or received by the UE 102a was successful or failed, or whether the call failure event 154 was a call drop event 154a or a call setup failure event 154b.

Each UE 102 that records call samples 150 may be configured to store the recorded call samples 150 in a database 122 (e.g., SQL Database) that is connected to the data network 130. For example, UE 102a may be configured to store call samples 150 in the database 122. In one embodiment, the database 122 may be hosted in a cloud service 120 and may be part of cloud storage provided by the cloud service 120.

In one or more embodiments, the performance server 140 may have access to the performance data relating to the call samples 150 collected using one or more UEs 102 such as UE 102a. In one embodiment, performance server 140 may (e.g., periodically or when needed) extract at least a portion of the data related to the call samples 150 stored in the database 122 from the cloud service 120 and store locally in memory 146. For example, performance server 140 may extract call samples 150 collected by a particular UE 102a and store locally in memory 146.

At operation 704, the performance server 140 plots the plurality of call failure samples 152 on a geographical map 176, wherein plotting the call failure samples 152 comprises plotting each call failure sample 152 at a geolocation 162 associated with the call failure sample 152.

At operation 706, the performance server 140 obtains information associated with a potential new cell site 178, wherein the information comprises a proposed geolocation 179 of the potential new cell site 178.

As described above, the performance server 140 may be configured to determine an impact that deploying a potential/proposed new cell site may have in improving call failure issues occurring at a geographical location where the potential new cell site is proposed for deployment, and further determine whether the potential new cell site is to be deployed at the geographical location based on a determined degree of impact associated with deploying the potential new cell site. In this context, the performance server 140 obtains information relating to one or more potential new cell sites 178 that are proposed for deployment, wherein the information relating to each potential new cell site 178 includes a proposed geolocation 179 at which the potential new cell site 178 is proposed for deployment.

To determine an impact of deploying a potential new cell site 178 at a proposed geolocation 179, the performance server analyzes call failure samples 152 recorded in the vicinity of the proposed geolocation 179. As described below, the performance server only considers and analyzes call failure samples 152 that are assigned to the third sample set 170c (e.g., Q3 shown in FIG. 2) and the fourth sample set 170d (e.g., Q4 shown in FIG. 2) since only those call failure samples 152 that are assigned to the third sample set 170c/Q3 and the fourth sample set 170d/Q4 are reliable indicators of network performance issues (e.g., poor coverage) in areas where these call failure samples 152 were collected. On the other hand, call failure samples 152 assigned to the first sample set 170a/Q1 and the second sample set 170b/Q2 are not reliable indicators of poor network coverage because the call failure events 154 associated with call failure samples 152 assigned to the first sample set 170a/Q1 and the second sample set 170b/Q2 are most likely caused by product issues, network outages, and/or signal interference and not by poor network coverage.

To analyze the call failure samples 152 in the vicinity of a proposed geolocation 179 of a potential new cell site 178, the performance server 140 digitally plots on a geographical map 176 call failure samples 152 recorded by UEs 102 in the vicinity of the proposed geolocation 179. The geographical map 176 may be a virtual map (e.g., digital map) of a region within which the potential new cell site 178 is proposed for deployment. It may be noted that the call failure samples 152 mapped on the geographical map 176 may include call failure samples 152 recorded by a single type of UE 102 (e.g., a plurality of smartphones of the same make and model) or recorded by a plurality of types of UEs 102 (e.g., a plurality of smartphones of different makes and models).

As described above, each call sample 150 (including call failure samples 152) include a geolocation 162 at which a recording UE 102 recording the call sample 150. Plotting a particular call failure sample 152 on the map 176 includes plotting the particular call failure sample 152 at a location on the map 176 that represents the geolocation 162 associated with the call failure sample 152.

At operation 708, the performance server 140 plots the potential new cell site 178 on the map 176 at the proposed geolocation 179.

As described above, in addition to plotting the call failure samples 152 on the map 176, performance server 140 may also be configured to digitally plot the locations of one or more potential new cell sites 178 on the map 176. For example, performance server 140 obtains the proposed geolocations 179 associated with one or more potential new cell sites 178 proposed for deployment in a particular region (e.g., city, county, neighborhood etc.) and plots the potential new cell sites on the map 176 at the respective proposed geolocations 179.

FIG. 5A illustrates a plot 500A showing call failure samples 152 and potential new cell sites 178 plotted on the geographical map 176, in accordance with one or more embodiments of the present disclosure. It may be noted that each circular dot shown in the plot 500A represents a distinct call failure sample 152.

At operation 710, the performance server 140 selects, on the map 176, an enclosed buffer area 180 around the potential new cell site 178, wherein the enclosed buffer area 180 associated with the potential new cell site 178 represents an estimated cell coverage of the potential new cell site 178.

At operation 712, the performance server 140 selects the call failure samples 152 enclosed by the buffer area 180.

At operation 714, among the selected call failure samples 152, the performance server 140 selects a set of call failure samples 152 that are associated with values of the coverage parameter 158 that are lower than a coverage threshold 172.

As described above, once the call failure samples 152 and the potential new cell sites 178 are plotted on the map 176, performance server 140 selects on the map 176 an enclosed buffer area 189 around each potential new cell site 178 plotted on the map 176. The enclosed buffer area 189 associated with a potential new cell site 178 represents an estimated cell coverage of the potential new cell site 178. In one embodiment, an identical pre-selected buffer area 180 may be selected for all potential new cell sites 178. In an alternative embodiment, different potential new cell sites 178 may have a different shape and/or size of the buffer area 180. FIG. 5B illustrates a plot 500B in which an enclosed buffer area 180 has been selected around each potential new cell site 178.

Once an enclosed buffer area 180 has been selected in the map 176 around each potential new cell site 178, the performance server 140 is configured to select only those call failure samples 152 that are enclosed within the buffer areas 180 of the respective potential new cell sites 178. For example, performance server 140 deletes all call failure samples 152 that are plotted on the map 176 outside the buffer areas 180. FIG. 5C illustrates a plot 500C in which all call failure samples 152 that are plotted outside the buffer areas 180 have been deleted and only those call failure samples 152 have been selected that are enclosed within the buffer areas 180 of the respective potential new cell sites 178. For each potential new cell site 178, the performance server 140 records a number (N) of all call failure samples 152 enclosed within the respective buffer area 180.

In one embodiment, in order to select the call failure samples 152 enclosed in the respective buffer areas 180 of the potential new cell sites 178, the performance server 140 generates a first map layer including all call failure samples 152 plotted on a first copy of the map 176. The performance server 140 also generates a second map layer including the potential new cell sites 178 and the respective buffer areas 180 plotted on a second copy of the map 176. The performance server 140 geospatially overlaps the first map layer and the second map layer. For each potential new cell site 178, the performance server 140 and selects the call failure samples 152 in a portion of the first map layer that overlaps with the respective buffer area of the new cell site 178.

Among the selected call failure samples 152 within the buffer areas 180 of the respective potential new cell sites 178, the performance server 140 further selects only those call failure samples 152 that are assigned to the third sample set 170c (shown as Q3 in FIG. 2) and the fourth sample set 170d (shown as Q4 in FIG. 2). The assumption here is that the call failure samples 152 plotted on the map 176 have already been analyzed and assigned to the sample sets 170. As described above and illustrated in FIGS. 2, both the third sample set 170c/Q3 and the fourth sample set 170d/Q4 include call samples 150 (including call failure samples 152) that are associated with poor coverage (e.g., coverage parameter 158 lower than coverage threshold 172). Thus, the call failure samples 152 assigned to the third sample set 170c/Q3 and the fourth sample set 170d/Q4 are reliable indicators of call failure events 154 recorded in poor coverage conditions. For each potential new cell site 178, the performance server 140 records a number (n) of call failure samples 152 that are enclosed within the respective buffer area 180 and are assigned to the third sample set 170c/Q3 and the fourth sample set 170d/Q4.

At operation 716, the performance server 140 calculates a percentage contribution (P) 188 of the call failure samples 152 in the set among all call failure samples 152 enclosed in the buffer area 180.

As described above, for each potential new cell site 178 plotted on the map 176, the performance server 140 calculates a percentage contribution (P) 188 of the call failure samples 152 assigned to the third sample set 170c/Q3 and the fourth sample set 170d/Q4 among all call failure samples (n) enclosed in the respective buffer area 180 of the potential new cell site 178. For example, performance server 140 calculates P as $P = (n/N) \times 100$. Referring to the example plot 300B of FIG. 3B, the total call failure samples 152 assigned to quadrants Q3 and Q4 is $(2316 + 5611) = 7927$. The total call failure samples 152 assigned to all four quadrants is 13k. Thus, $P = [(2316 + 5611)/13000] \times 100 = 60.99\%$.

At operation 718, performance server 140 checks whether the percentage contribution (P) 188 calculated for the potential new cell site 178 equals or is greater than a first percentage threshold and whether the number (n) of call failure samples 152 enclosed in the buffer area 180 equals or exceeds a second number threshold. If P is lower than the first threshold or n is lower than the second threshold, method 700 proceeds to operation 720 where the performance server 140 determines that the potential new cell site 178 is not to be deployed. On the other hand when $P \geq 1^{st}$ threshold and $n \geq 2^{nd}$ threshold, the method 700 proceeds to operation 722 where the performance server 140 determines that the potential new cell site 178 is to be deployed at the respective proposed geolocation 179.

As described above, performance server 140 may be configured to determine whether a particular potential new cell site 178 is to be deployed at a respective proposed geolocation 179 based on the percentage contribution (P) 188 calculated for the particular potential new cell site 178 and the number (n) of call failure samples 152 enclosed in the respective buffer area 180 that are assigned to the third sample set 170c/Q3 and the fourth sample set 170d/Q4. The combination of the percentage contribution (P) 188 calculated for the particular potential new cell site 178 and the number (n) of call failure samples 152 enclosed in the respective buffer area 180 that are assigned to the third sample set 170$c$/Q3 and the fourth sample set 170$d$/Q4 represent an impact of deploying the particular potential new cell site 178 in improving call failure issues recorded in the vicinity of the respective proposed geolocation 179. In one embodiment, when the values of P and n associated with the particular potential new cell site 178 equal or exceed a first threshold and a second threshold respectively, performance server 140 determines that the impact of deploying the particular potential new cell site 178 is sufficiently large to warrant deployment of the potential new cell site 178. On the other hand, when one or both of P and n associated with the particular potential new cell site 178 are lower than their respective thresholds, performance server 140 determines that the impact of deploying the particular potential new cell site 178 is not sufficiently large to warrant deployment of the potential new cell site 178.

Accordingly, performance server 140 may be configured to determine that a particular potential new cell site 178 is to be deployed when the values of P and n associated with the particular potential new cell site 178 equal or exceed a first threshold and a second threshold respectively. Alternatively, performance server 140 may be configured to determine that a particular potential new cell site 178 is not to be deployed when the values of one or both of P and n associated with the particular potential new cell site 178 are lower than their respective thresholds. Thus, in other words, the performance server 140 uses the combined condition of P equals or exceeds the first threshold and n equals or exceeds the second threshold as the minimum criteria for deployment of a potential new cell site 178 at a respective proposed geolocation 179.

In one or more embodiments, when multiple potential new cell sites 178 in a selected region are determined to satisfy the minimum criteria described above for deployment, performance server 140 may be configured to rank the potential new cell sites 178 that satisfy the minimum criteria based on the values of percentage contributions (P) 188 calculated for the potential new cell sites 178. In one embodiment, the performance server 140 selects the potential new cell sites 178 that satisfy the minimum criteria and ranks the selected potential new cell sites based on the respective percentage contributions (P) 188 calculated for the selected potential new cell sites 178, wherein a higher rank is assigned to a potential new cell sites 178 having a higher respective percentage contribution (P) 188. In one embodiment, the performance server 140 determines that a pre-selected number of the highest ranked potential new cell sites 178 are to be deployed at respective proposed geolocations 179.

In one embodiment, the call failure samples 152 analyzed to determine deployment decisions relating to potential new cell sites 178 as described above include only those call failure samples 152 recorded by one or more best performing types of UEs 102 (e.g., best performing smartphone makes and models). For example, to make a deployment decision relating to a particular potential new cell site 178, the performance server 140 may analyze call failure samples 152 recorded by a particular type of UE 102 (e.g., particular make/model/version of smartphone) that recorded a least number of call failure samples 152 compared to call failure samples 152 recorded by other types of UEs. For example, as described above with reference to FIGS. 3A and 3B, the performance server 140 calculates a call failure rate for each type of UE 102 that collected call failure samples 152 and considers only those call failure samples 152 that were collected by a UE 102 associated with a lowest call failure rate.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may 5 be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:

a memory storing data relating to call failures that occurred in a wireless communication network; and a processor communicatively coupled to the memory and configured to:

access from the memory the data relating to the call failures, wherein the data comprises:

a plurality of call failure samples, wherein:

each call failure sample is associated with a wireless call placed from a particular user equipment (UE);

each call failure sample is associated with a call failure event;

each call failure event comprises a call drop event or a call setup failure event;

a coverage parameter associated with each call failure sample, wherein each coverage parameter indicates a power associated with a network signal measured by a particular UE; and a signal quality parameter associated with each call failure sample, wherein each signal quality parameter indicates a quality of a network signal measured by a particular UE;

classify the plurality of call failure samples into a plurality of sets of the call failure samples, wherein each set of the call failure samples is associated with a first range of values of the coverage parameter and a second range of values of the signal quality parameter;

obtain one or more remedial actions associated with a particular set of the call failure samples, wherein each set of the call failure samples is associated with respective at least one remedial actions; and generate an indication that the one or more remedial actions is to be performed to resolve call failure events associated with call failure samples in the particular set of the call failure samples.

2. The system of claim 1, wherein the processor classifies the plurality of call failure samples by:

generating a set of the call failure samples associated with values of the coverage parameter that equal or exceed a coverage threshold and values the signal quality parameter that equal or exceed a signal quality threshold.

3. The system of claim 2, wherein:

the particular set of the call failure samples comprises the generated set of the call failure samples; and the one or more remedial actions associated with the generated set of the call failure samples comprises improving device performance associated with UEs involved in call failure events associated with the call failure samples in the generated set of the call failure samples.

4. The system of claim 1, wherein the processor classifies the plurality of call failure samples by:

generating a set of the call failure samples associated with values of the coverage parameter that equal or exceed a coverage threshold and values of the signal quality parameter that are lower than a signal quality threshold.

5. The system of claim 4, wherein:

the particular set of the call failure samples comprises the generated set of the call failure samples; and the one or more remedial actions associated with the generated set of the call failure samples comprises reducing signal interference in geographical areas where the call failure samples in the generated set are recorded.

6. The system of claim 1, wherein the processor classifies the plurality of call failure samples by:

generating a set of the call failure samples associated with values of the coverage parameter that are lower than a coverage threshold and values of the signal quality parameter that are lower than a signal quality threshold.

7. The system of claim 6, wherein:

the particular set of the call failure samples comprises the generated set of the call failure samples; and the one or more remedial actions associated with the generated set of the call failure samples comprises adding new cell sites in geographical areas where the call failure samples in the generated set are recorded.

8. The system of claim 1, wherein the processor classifies the plurality of call failure samples by:

generating a set of the call failure samples associated with values of the coverage parameter that are lower than a coverage threshold and values of the signal quality parameter that equal or exceed a signal quality threshold.

9. The system of claim 8, wherein:

the particular set of the call failure samples comprises the generated set of the call failure samples; and the one or more remedial actions associated with the generated set of the call failure samples comprises improving signal coverage in geographical areas where the call failure samples in the generated set are recorded.

10. The system of claim 1, wherein the coverage parameter comprises Reference Signal Received Power (RSRP).

11. The system of claim 1, wherein the signal quality parameter comprises Signal to Interference Noise Ratio (SINR).

12. A method for deploying new cell sites in a wireless communication network, comprising:

accessing from a memory data relating to call failures that occurred in the wireless communication network, wherein the data comprises:

a plurality of call failure samples, wherein:

each call failure sample is associated with a wireless call placed from a particular user equipment (UE);

each call failure sample is associated with a call failure event;

each call failure event comprises a call drop event or a call setup failure event;

a coverage parameter associated with each call failure sample, wherein each coverage parameter indicates a power associated with a network signal measured by a particular UE; and a signal quality parameter associated with each call failure sample, wherein each signal quality parameter indicates a quality of a network signal measured by a particular UE;

classifying the plurality of call failure samples into a plurality of sets of the call failure samples, wherein each set of the call failure samples is associated with a first range of values of the coverage parameter and a second range of values of the signal quality parameter;

obtaining one or more remedial actions associated with a particular set of the call failure samples, wherein each set of the call failure samples is associated with respective at least one remedial actions; and generating an indication that the one or more remedial actions is to be performed to resolve call failure events associated with call failure samples in the particular set of the call failure samples.

13. The method of claim 12, wherein classifying the plurality of call failure samples comprises:

generating a set of the call failure samples associated with values of the coverage parameter that equal or exceed a coverage threshold and values the signal quality parameter that equal or exceed a signal quality threshold.

14. The method of claim 13, wherein:

the particular set of the call failure samples comprises the generated set of the call failure samples; and the one or more remedial actions associated with the generated set of the call failure samples comprises improving device performance associated with UEs involved in call failure events associated with the call failure samples in the generated set of the call failure samples.

15. The method of claim 12, wherein classifying the plurality of call failure samples comprises:

generating a set of the call failure samples associated with values of the coverage parameter that equal or exceed a coverage threshold and values of the signal quality parameter that are lower than a signal quality threshold.

16. The method of claim 15, wherein:

the particular set of the call failure samples comprises the generated set of the call failure samples; and the one or more remedial actions associated with the generated set of the call failure samples comprises reducing signal interference in geographical areas where the call failure samples in the generated set are recorded.

17. A non-transitory computer-readable medium storing instructions that when executed by a processor cause the processor to:

access from a memory data relating to call failures that occurred in a wireless communication network, wherein the data comprises:

a plurality of call failure samples, wherein:

each call failure sample is associated with a wireless call placed from a particular user equipment (UE);

each call failure sample is associated with a call failure event;

each call failure event comprises a call drop event or a call setup failure event;

a coverage parameter associated with each call failure sample, wherein each coverage parameter indicates a power associated with a network signal measured by a particular UE; and a signal quality parameter associated with each call failure sample, wherein each signal quality parameter indicates a quality of a network signal measured by a particular UE;

classify the plurality of call failure samples into a plurality of sets of the call failure samples, wherein each set of the call failure samples is associated with a first range of values of the coverage parameter and a second range of values of the signal quality parameter;

obtain one or more remedial actions associated with a particular set of the call failure samples, wherein each set of the call failure samples is associated with respective at least one remedial actions; and generate an indication that the one or more remedial actions is to be performed to resolve call failure events associated with call failure samples in the particular set of the call failure samples.

18. The non-transitory computer-readable medium of claim 17, wherein classifying the plurality of call failure samples comprises:

generating a set of the call failure samples associated with values of the coverage parameter that equal or exceed a coverage threshold and values the signal quality parameter that equal or exceed a signal quality threshold.

19. The non-transitory computer-readable medium of claim 18, wherein:

the particular set of the call failure samples comprises the generated set of the call failure samples; and the one or more remedial actions associated with the generated set of the call failure samples comprises improving device performance associated with UEs involved in call failure events associated with the call failure samples in the generated set of the call failure samples.

20. A non-transitory computer-readable medium of claim 17, wherein classifying the plurality of call failure samples comprises:

generating a set of the call failure samples associated with values of the coverage parameter that equal or exceed a coverage threshold and values of the signal quality parameter that are lower than a signal quality threshold.

\* \* \* \* \*